(12) United States Patent
Enomoto

(10) Patent No.: US 6,237,045 B1
(45) Date of Patent: May 22, 2001

(54) INTERACTIVE INFORMATION PROCESSING SYSTEM

(75) Inventor: Hajime Enomoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/929,087

(22) Filed: Sep. 15, 1997

Related U.S. Application Data

(63) Continuation of application No. 08/399,709, filed on Mar. 3, 1995, now abandoned.

(30) Foreign Application Priority Data

Mar. 4, 1994 (JP) .................................................. 6-034701
Mar. 1, 1995 (JP) .................................................. 7-041572

(51) Int. Cl.[7] .............................. G06F 9/00; G06F 17/00
(52) U.S. Cl. ......................................... 709/328; 706/11
(58) Field of Search ........................... 434/170; 382/107; 395/778; 709/300–308, 310–332; 706/10, 11

(56) References Cited

U.S. PATENT DOCUMENTS

| | | | | |
|---|---|---|---|---|
| 5,002,491 | * | 3/1991 | Abrahamson et al. | 434/322 |
| 5,013,245 | * | 5/1991 | Benedict | 434/170 |
| 5,313,581 | * | 5/1994 | Giokas et al. | 395/200 |
| 5,398,336 | * | 3/1995 | Tantry et al. | 395/600 |
| 5,450,583 | * | 9/1995 | Inada | 395/650 |
| 5,511,193 | * | 4/1996 | Tung et al. | 395/650 |
| 5,682,542 | * | 10/1997 | Enomoto et al. | 395/778 |
| 5,719,947 | * | 2/1998 | Enomoto et al. | 382/107 |

FOREIGN PATENT DOCUMENTS 0 433 768   8/1991   (EP) .
0 557 205   8/1993   (EP) .

OTHER PUBLICATIONS

Saeki et al; "Software Development Process from Natural Language Specification", ACM, pp 64–73, 1989.*
Enomoto et al. "Coding of Color Picture using Potential Method", IEEE pp 459–462, 1988.*
Yang et al., "Utility Servers in Charlotte," *Software—Practice and Experience*, vol. 21, No. 5, May 1991, pp. 420–441.
Miyamoto et al., "Integration of picture painting process by domain specific extensible system," *SPIE*, vol. 2094, *Reprinted from Visual Communications and Image Processing '93*, Nov. 8–11, 1993, pp. 1400–1411.
Hashimoto et al., "Interactive specification and data schema for picture painting process," *SPIE*, vol. 2094, *Reprinted from Visual Communications and Image Processing '93*, Nov. 8–11, 1993, pp. 1412–1423.

(List continued on next page.)

*Primary Examiner*—Majid A. Banankhah
*Assistant Examiner*—P. G. Caldwell
(74) *Attorney, Agent, or Firm*—Staas & Halsey LLP

(57) ABSTRACT

According to the first aspect of the present invention, a communication manager is interposed between a common platform having a plurality of windows and an extensible Window-based Elaboration Language (WELL) system. The communication manager uses a template to convert data between a visible object rendered in the common platform and a data structure discernible by a computer. An extensible WELL kernel activates a required service module in response to an instruction entered by a user through the common platform and transmitted via the communication manager. According to the second aspect of the present invention, an agent-role server having the foregoing configuration is installed as a client of specific role servers each having the foregoing configuration. Thus, an interactive information system having an agent capability is constructed.

3 Claims, 26 Drawing Sheets

OTHER PUBLICATIONS

Kimura et al., "Dialogic modification of picture by interactive process of processing and painting," *SPIE*, vol. 2308, *Reprinted from Visual Communications and Image Processing '94*, Sep. 25–29, 1994, pp. 725–735.

Hirai et al., "Service management in the picture processing and painting system having extensible functions," *SPIE*, vol. 2308, *Reprinted from Visual Communications and Image Processing '94*, Sep. 25–29, 1994, pp. 736–747.

* cited by examiner

Fig.20

TEMPLATE FOR A FIRST PRINCIPAL POINT

| INDEX | X | Y | LUMINANCE | CHROMATICITY VECTOR | POINTER |

TEMPLATE FOR A SECOND PRINCIPAL POINT

| INDEX | X | Y | LUMINANCE | CHROMATICITY VECTOR | POINTER |

TEMPLATE FOR A THIRD PRINCIPAL POINT

| INDEX | X | Y | LUMINANCE | CHROMATICITY VECTOR | POINTER |

TEMPLATE FOR A n-TH PRINCIPAL POINT

| INDEX | X | Y | LUMINANCE | CHROMATICITY VECTOR | POINTER |

TEMPLATE

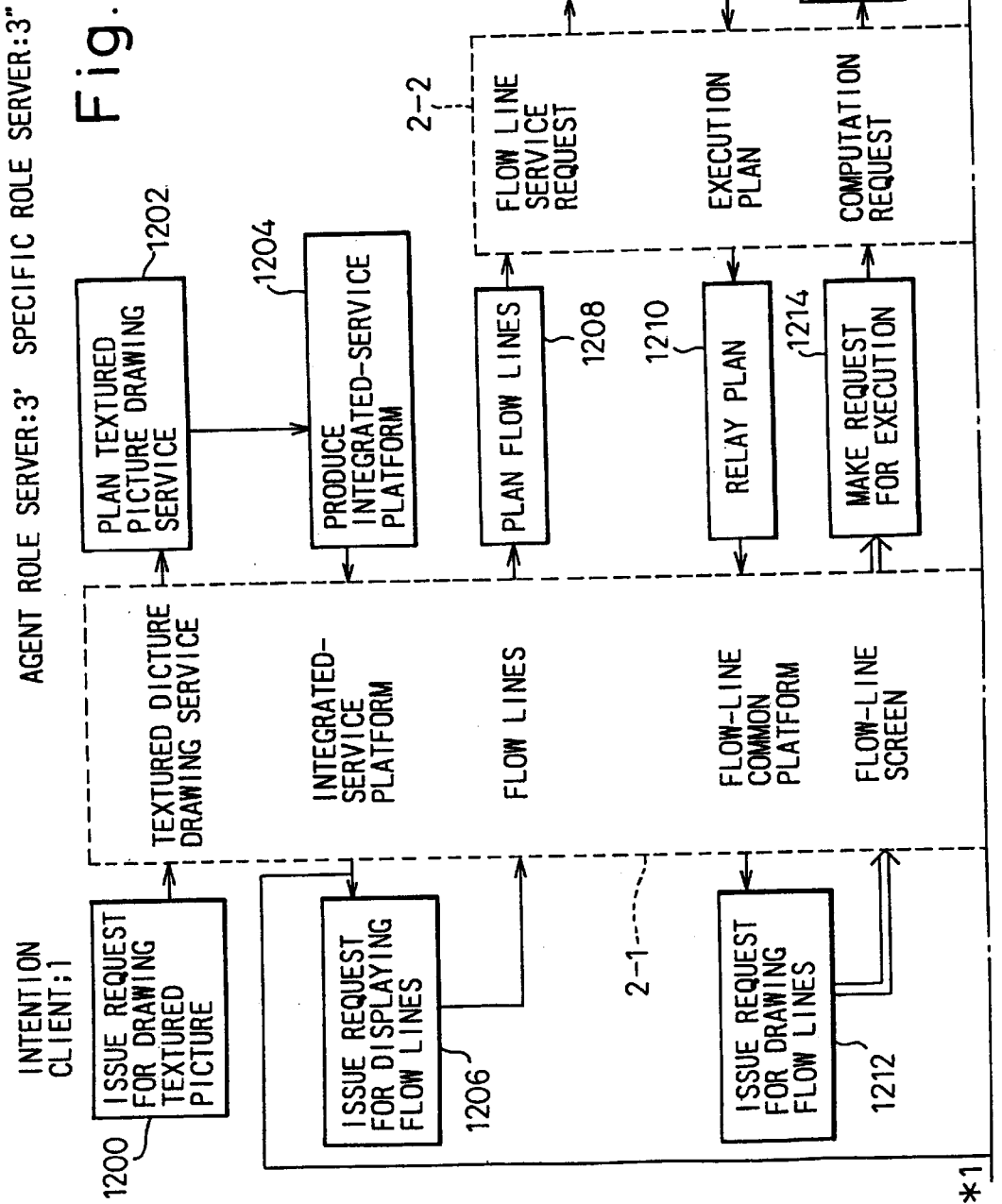

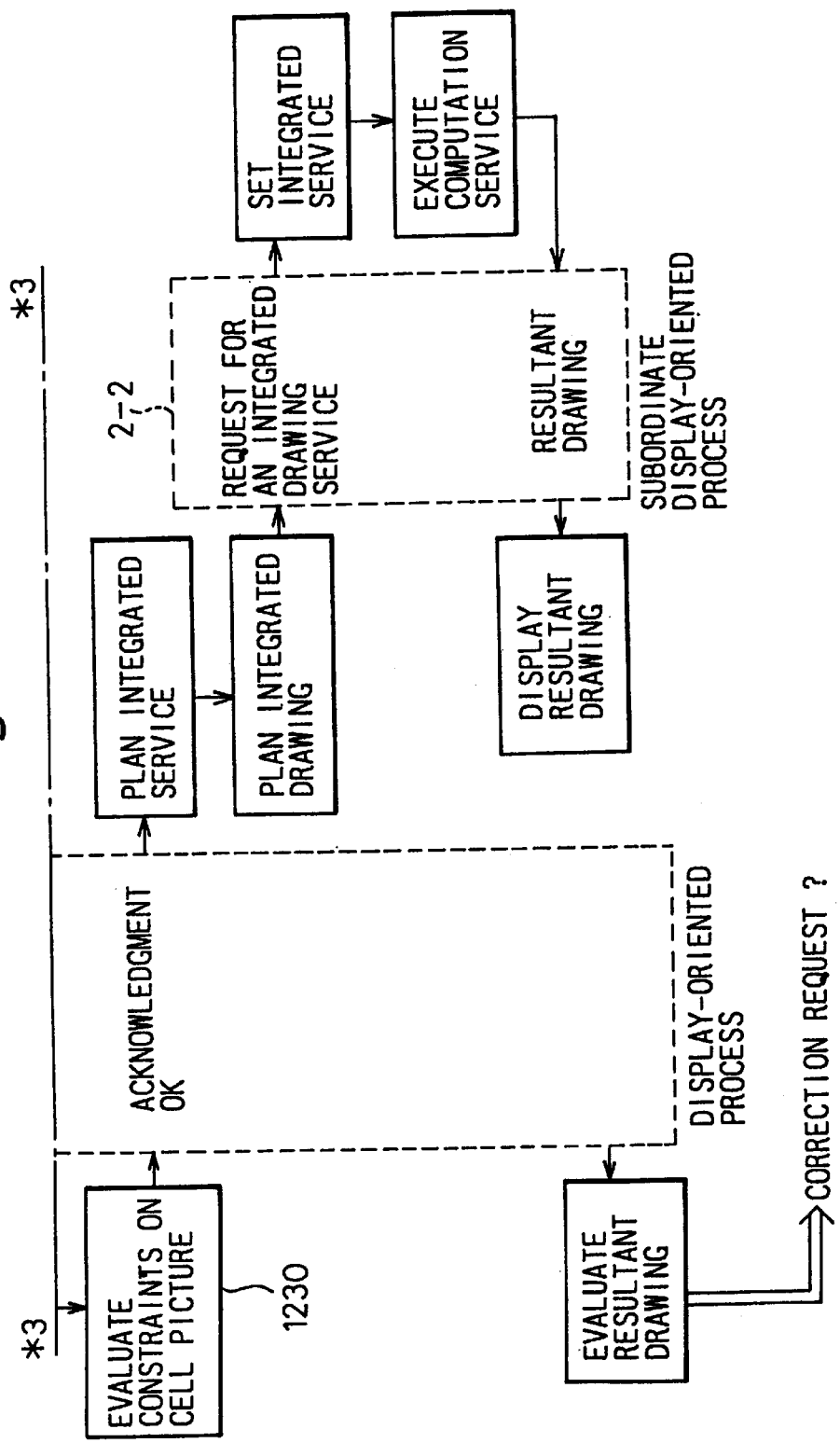

INTERACTIVE INFORMATION PROCESSING SYSTEM

This application is a continuation of application Ser. No. 08/399,709, filed Mar. 3, 1995, now abandoned.

BACKGROUND OF THE INVENTION

1. Field of the Invention

The present invention relates to an interactive information processing system for accomplishing a variety of objects through interaction between a user and a machine via a common platform having a plurality of windows.

2. Description of the Related Art

The present inventor has proposed a "language processing system based on an object network" in U.S. patent application Ser. No. 08/279,861 (continuation application of U.S. patent application Ser. No. 08/019,272). The system is referred to as a Window-based Elaboration Language (hereinafter, WELL) system. A graph-structure object network having noun objects representing "points", "segments", etc. as nodes and verb objects representing "drawing", "painting", etc. as branches is rendered in one window in a multi-window system. A user selects the noun objects and verb objects in the object network one by one and proceeds with work while viewing the object network appearing in the window and a data window rendering the results of processing.

In the WELL system, transactions are visually rendered in the form of an object network and are therefore easy for a human being to understand. The WELL system can therefore be said to be a user-friendly system for a designer of transactions as well as a system user. However, the proposed system is designed to be adaptable for a specific field and therefore has little dynamic expansibility to other fields. Since a running system itself is customized in advance in conformity with a specific field, while the system is running, the application field cannot be altered dynamically.

In addition, because of the little dynamic expansibility to different fields, there is difficulty in constructing a hierarchical system with an agent capability in which an agent-role server of an upper level issues a specific instruction to a plurality of specific role servers of lower levels according to a user's intention.

SUMMARY OF THE INVENTION

The first object of the present invention is to provide an interactive information processing system that offers dynamic expansibility to any different field owing to an innovative WELL system.

The second object of the present invention is to provide an interactive information processing system having an agent capability.

According to the present invention, there is provided an interactive information processing system comprising: a means for producing a common platform composed of a plurality of windows; a communication manager for converting data between a visible object rendered in the common platform and a data structure discernible by a computer; a plurality of service modules; and a processing means for selectively activating the plurality of service modules according to an instruction issued by a user via the common platform and communication manager.

According to the present invention, there is provided an interactive information processing system comprising: an agent-role server including a means for producing a first common platform composed of a plurality of windows for use in interacting with a client; and a specific role server having a means for producing a second common platform composed of a plurality of windows for use in interacting with a client. For operating the system, a client of the agent-role server is a user of the system and a client of the specific role server is the agent-role server.

BRIEF DESCRIPTION OF THE DRAWINGS

FIG. 20 is a diagram showing a template for a segment;

FIGS. 23A, 23B, 24A and 24B are diagrams showing a sequence of drawing a textured picture;

DESCRIPTION OF THE PREFERRED EMBODIMENTS

Figure 1:
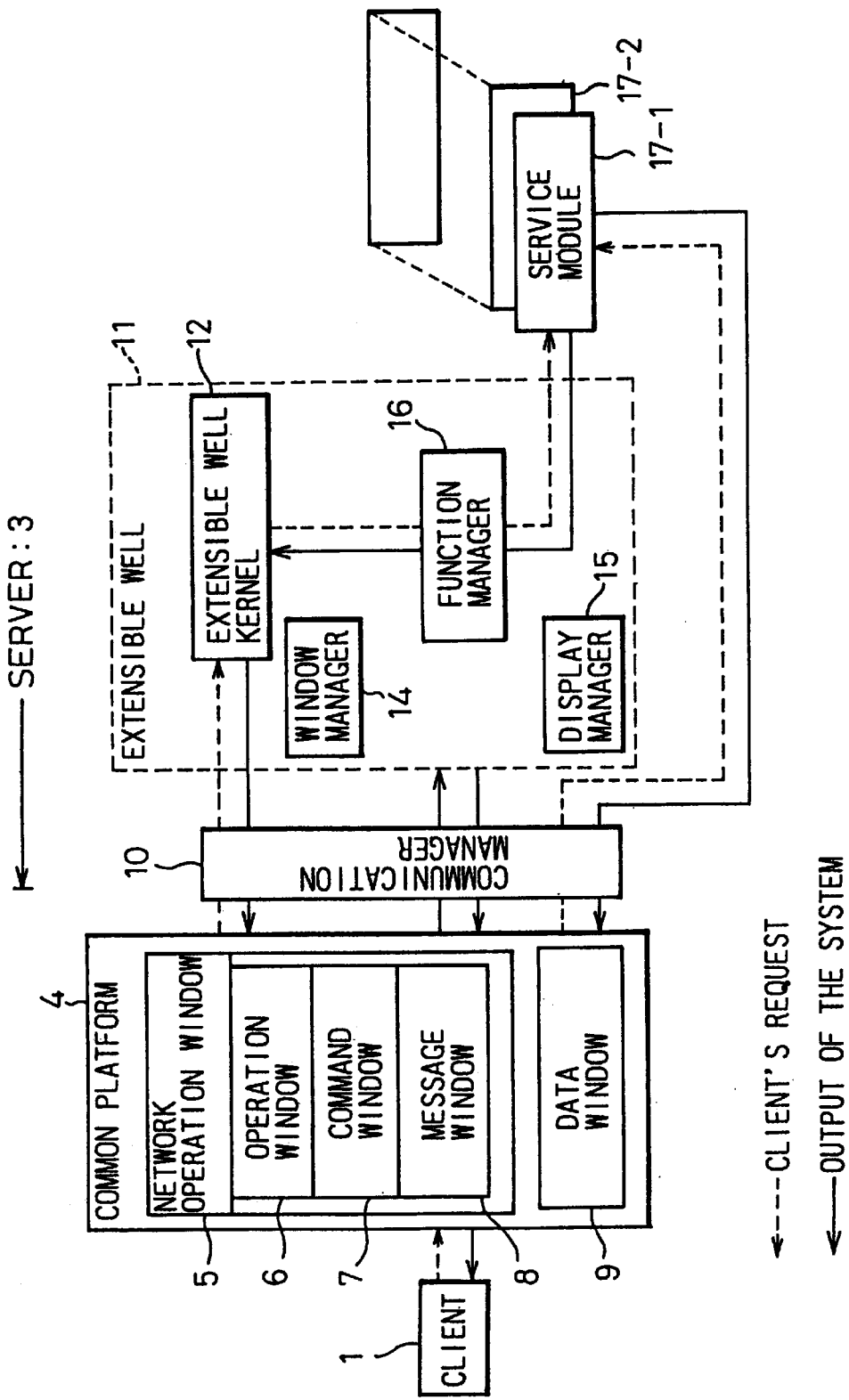
FIG. 1 is a block diagram showing an interactive information processing system having a field expansion facility in accordance with the first embodiment of the present invention.

FIG. 1 shows an interactive information processing system having a field expansion facility in accordance with the first embodiment of the present invention. The system comprises an extensible WELL system 11 made by implementing field expansibility in the aforesaid WELL system, a common platform 4 to be produced by the extensible WELL system 11, a communication manager 10 lying between the common platform 4 and extensible WELL system 11 and serving as one of service managers for the extensible WELL system, a plurality or service modules 17-1, 17-2, etc., that are packaged in order to execute unit transactions in reality. When this system is regarded as a server 3 serving a client, the server 3 interacts with the client through the common platform 4.

The common platform 4 includes a network window 5, an operation window 6, a command window 7, a message window 8, and a data window 9. The network window 5 is used by the client (user) 1 for controlling the whole system. The operation window 6 is used to render an object network having noun objects as nodes and verb objects as branches, and allows the client (user) 1 to select any of the noun and verb objects. The command window 7 is used to render options and allows the client to select any of the options. The message window 8 is used to render messages sent from the system to the client and allows the client to enter responses if necessary. The data window 9 is used to render the results of transactions and allows the client 1 to designate points, segments, or any other entities.

For smoother progress of an interactive process, it is effective to assign the role to a service process. As for expression symbols, human beings find images and graphics more instinctively understandable at sight than texts. By contrast, machines prefer logic descriptions. Therefore, the communication manager 10 is included as one of the plurality of service managers for the extensible WELL system. The communication manager 10 converts an instruction entered by the client 1 through the common platform 4 into data recognizable by the service modules 71-$i$, and then passes the resultant data to the service modules 17-$i$. The communication manager 10 in turn renders as many messages and data provided by the service modules 17-$i$ as possible in the form of visible objects in the common platform 4. Thus, flows of data between the service modules 17-$i$ and common platform are managed indirectly via the communication manager 10. Since the communication manager 10 thus manages an interactive process in a centralized fashion, the expansibility of the extensible WELL system is guaranteed.

Figure 2:
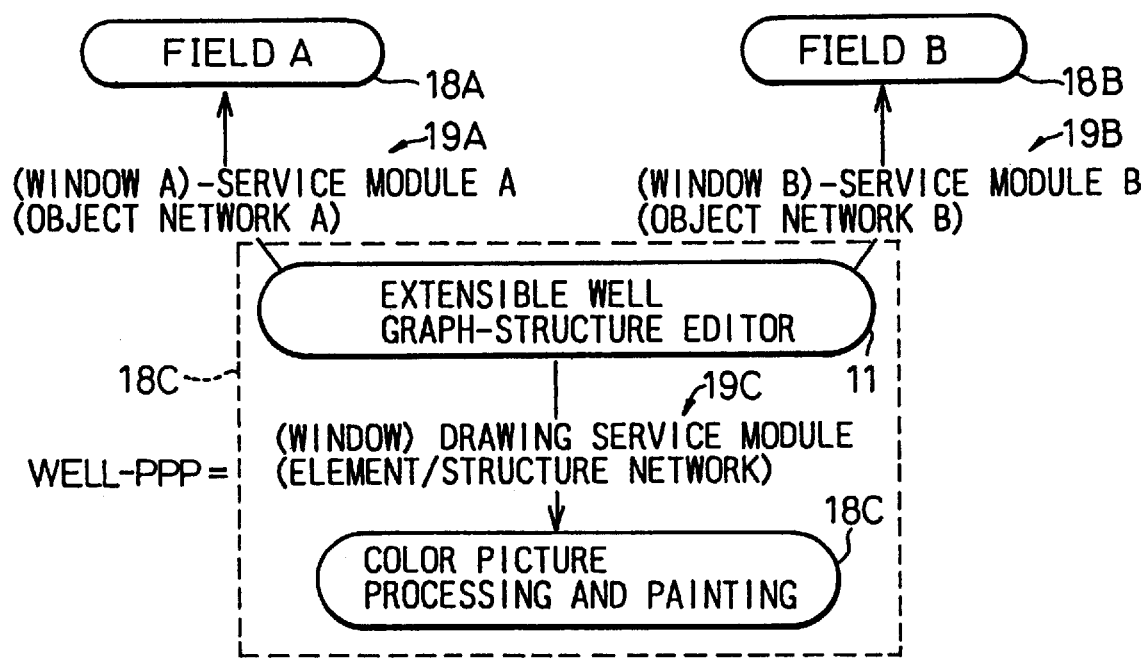
FIG. 2 is an explanatory diagram concerning the field expansion facility in an extensible WELL system.

Data conversion between the extensible WELL system 11 independent of any field and the service modules 17-$i$ dependent on fields is achieved by the communication manager 10. The presence of the communication manager 10 makes it possible to handle data concerning a variety of processing system dedicated to field A 18A. A definition of "Window A" is appended to a definition of the object network A. For execution, "service module A" required for handling field A is called. Service module A consists of a plurality of service modules. Likewise, when the extensible WELL system 11 is provided with "object network B" 19B, it becomes a processing system dedicated to "field B" 18B. When the extensible WELL system 11 is provided with an element/structure network 19C for use in producing and coloring color images, a color image producing/coloring system 18C' referred to as a Window-based Elaboration Language for Picture Processing and Painting (WELL-PPP) indicated with a dashed line in FIG. 2 is constructed. The object networks dedicated to specific fields are designed using a technique described in the U.S. patent application Ser. No. 08/279,861, and are placed in memory.

As described previously, the extensible WELL system 11 has the ability to modify (replace) a graph-structure object network at the time of execution so that the object network will has field expansibility. This ability of the extensible WELL system 11 and the ability thereof to produce and edit a new object network are, as shown in FIG. 2, referred to as a "graph-structure editor."

Figure 3:
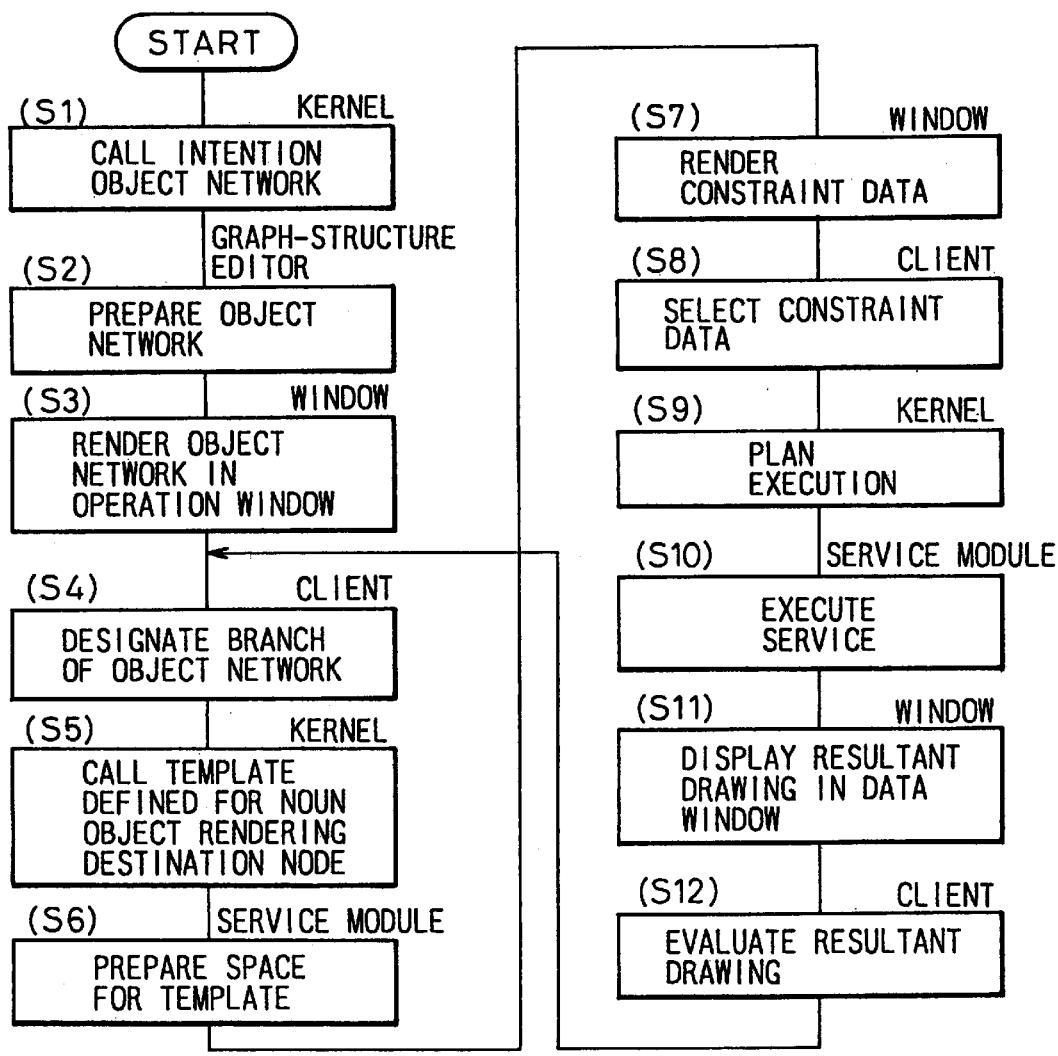
FIG. 3 is a flowchart describing the operations of the system in FIG. 1.

FIG. 3 is a flowchart describing the operations of the system shown in FIG. 1. Processing steps will be described below.

At step S1, assuming that the system is adapted for the field of color image producing/coloring 18C, the extensible WELL kernel 12 calls the object network 19 according to an instruction entered by a client.

At step S2, in response to the instruction, the graph-structure editor stores the object network in a work space in the WELL kernel 12.

At step S3, the WELL kernel 12 activates the window manager 14 and display manager 15 shown in FIG. 1, and fields. The versatility of the extensible WELL system itself will not be impaired.

The service managers for the extensible WELL system include not only the service manager 10 but also a window manager 14, a display manager 15, and a function manager 16. The window manager 14 produces the common platform 4 made up of various windows 5 to 9. The display manager 15 converts data to be rendered in the common platform 10 into a visible object and delivers it to the communication manager 10. The function manager 16 manages the plurality of service modules 17-1, 17-2, etc., which are stored as subroutines or functions, in a centralized fashion. An instruction entered by a client through the operation window in the common platform 4 is transferred to the function manager 16 via an extensible WELL kernel 12. In response to the instruction, the function manager 16 selects a required service module and calls the service module.

The extensible WELL kernel 12 is responsible for the processing below:

(1) retrieving an associated object network according to an instruction issued by a client;

(2) identifying the state of data (identifying a process and selecting a function to be executed next);

(3) analyzing an event (identifying an event sent through each window and calling a procedure that handles the event and resides in the system); and (4) making a request for execution of a function (appending constraints to a generic function and making a request for execution of the function).

The interactive information processing system shown in FIG. 1 is implemented in a workstation or personal computer having a multi-window facility.

FIG. 2 is an explanatory diagram concerning the field expansibility of the extensible WELL system. When the extensible WELL system 11 is provided with, for example, an "object network A" 19A, it becomes a receives responses from the managers. With arbitration by the communication manager 10, the object network is rendered in the operation window 6.

At step S4, a client views the object network through the operation window 6, and designates the whole or part of the object network so as to express his/her intention.

At step S5, the kernel 12 recognizes the situation via the communication manager 10, calls a template associated with the object, and displays it at a location to be processed.

At step S6, the service module prepares a space for the template.

At step S7, the common platform extracts constraint data from the template if any, and renders the constraint data in the message window 8.

At step S8, the client selects desired constraint data from the rendered constraint data.

At step S9, the kernel 12 recognizes the situation via the communication manager 10 and plans execution.

At step S10, the service module executes desired processing (for example, drawing or coloring).

At step S11, the resultant drawing is displayed in the data window 9.

At step S12, the client evaluates the resultant drawing and enters a subsequent instruction.

Assuming that the object network 19C designed for color image coloring is selected as an object network, the actions of the interactive information processing system in accordance with the present invention will be described in detail.

An element network that is an object network is composed of a frame section for rendering the appearance of an individual object and producing the outline defining an area and a color section for assigning attribute values according to lines and an area defined with the lines.

Figure 4:
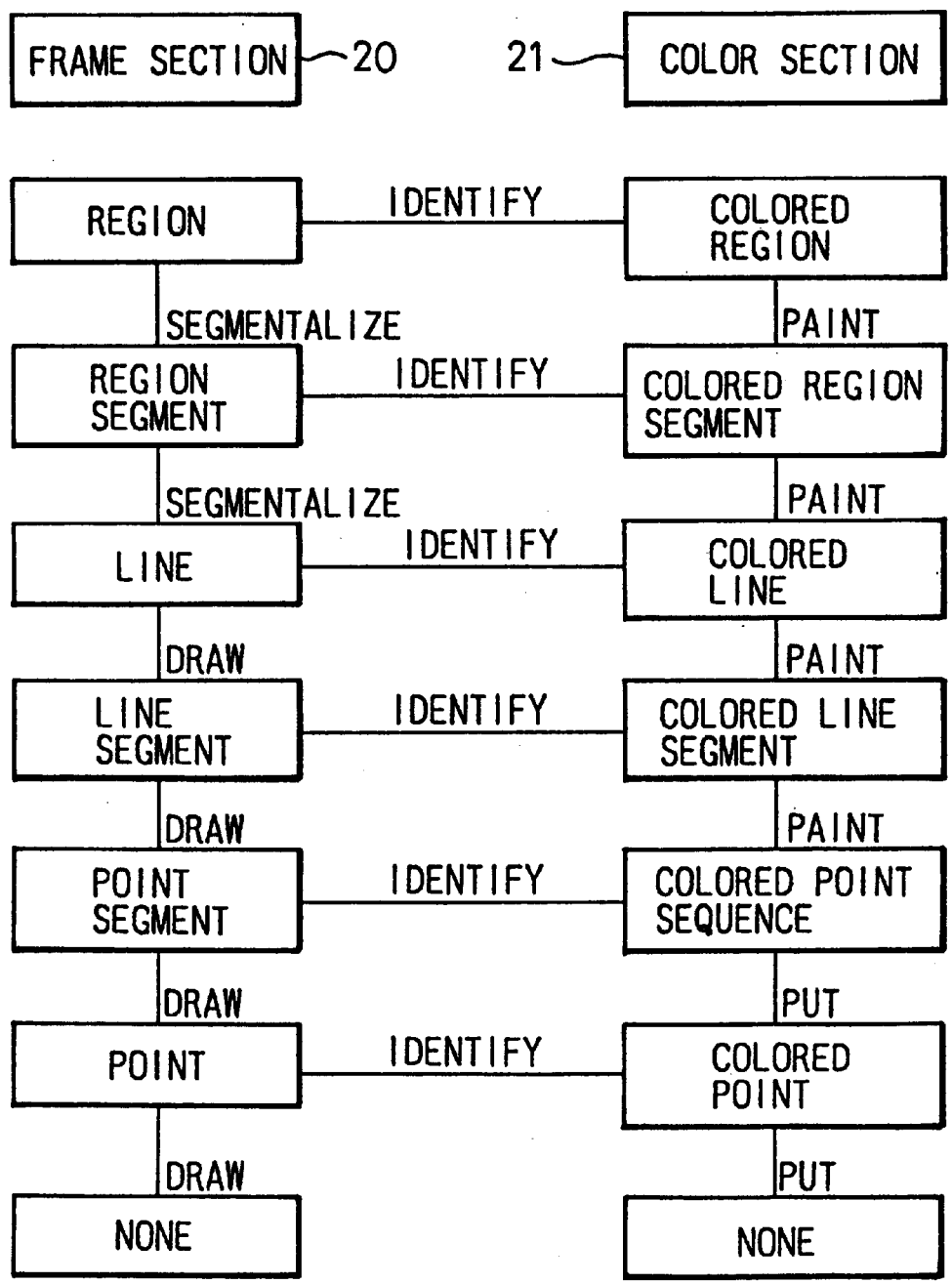
FIG. 4 shows an example of an object network.

FIG. 4 shows an example of the element network. A frame section 20 in the left-hand part of FIG. 4 is comparable to the above frame section, while a color section 21 in the right-hand part thereof is comparable to the above color section.

The frame section 20 produces entities including points and segments. The color section 21 specifies attributes of luminance and chromaticity. Points and segments are represented by noun objects, while drawing and identifying are represented by verb objects. The noun objects represent entities as described below.

None: represents an unprocessed state.

Point: represents a point essential to an outline and is referred to as a principal point.

Point Sequence: represents an order in which the principal points are linked.

Line: represents a state in which line segments are linked to complete one line.

Region Segment: represents a region defined with one horizontal scanning line in an image.

Region: represents region segments vertically linked along an image.

Colored to: represents items describing luminance and chromaticity. Identify for use in linking the frame section with the color section is defined as follows:

Identify: represents specifying of an object to be processed.

Using the network shown in FIG. 4, a client can achieve drawing. Drawing modes are described in the U.S. patent application Ser. No. 08/279,861 (entitled "Language Processing System Based on an Object Network").

Figure 5:
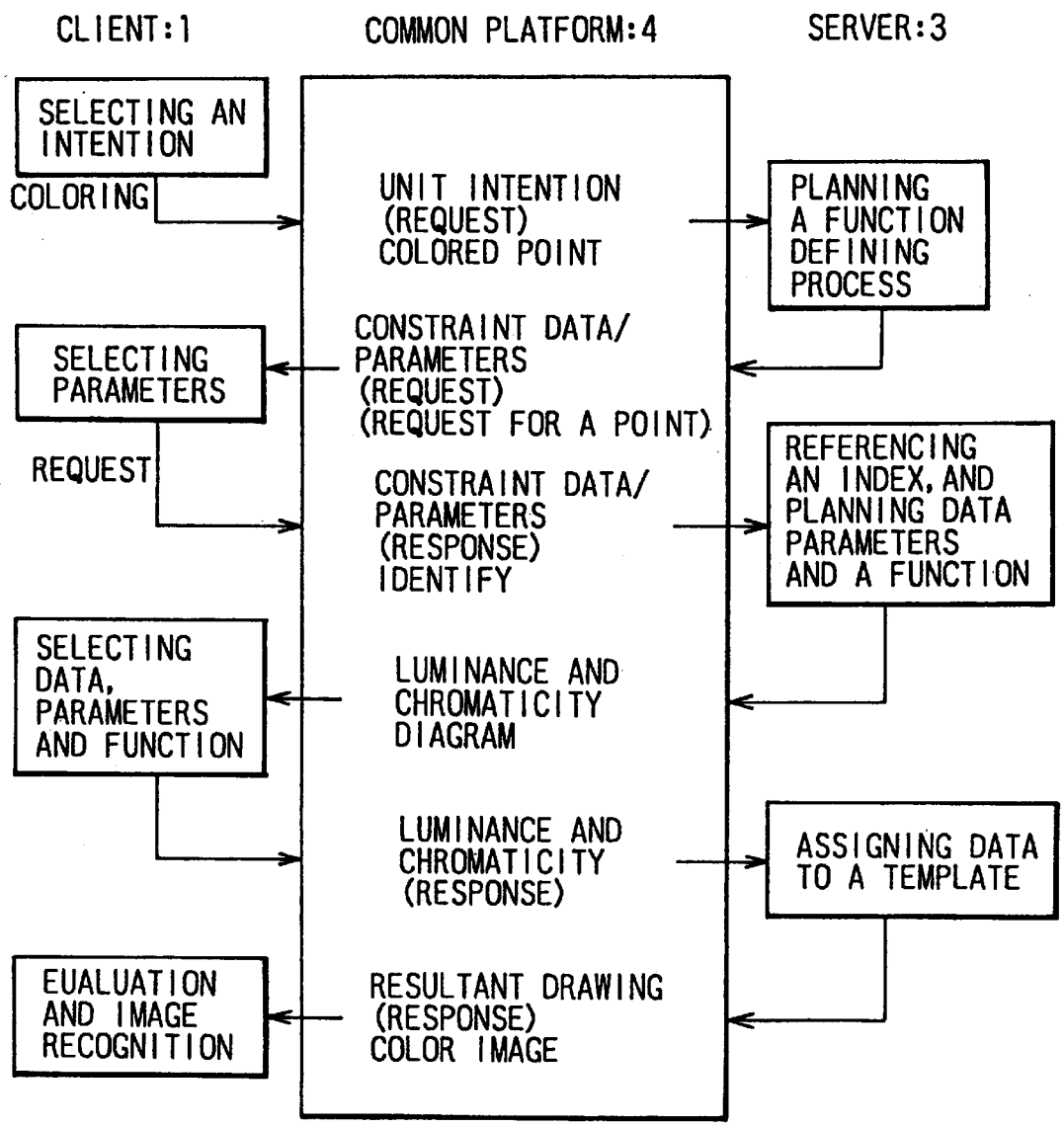
FIG. 5 is an explanatory diagram concerning a role of a common platform.

FIG. 5 shows a mode of color image producing/coloring in a system having a common platform. In FIG. 5, reference numerals 1, 3, and 4 denote the same components as those in FIG. 1.

Through a window appearing in the common platform 4, the client 1 visually understands that an element network has been implemented. The client 1 then selects the intention of drawing (of a class). In this example, Colored Point is selected in order to provide a point with luminance and chromaticity. In response to the client's request for coloring a point, the server prepares a template for use in storing information and asks the client to which point color information should be allocated. The template will be described later. When the client 1 specifies a point using Identify, the server 3 identifies the point by referencing an index in the associated template and asks the client 1 for luminance and chromaticity data concerning the point. When receiving the data as a response from the client 1, the server 3 inputs the data into the template and displays a resultant color image in a window. With the display, the client 1 discerns the resultant image, evaluates it, and then proceeds to selection of a subsequent intention. Thus, the client 1 recognizes his/her own intention returned by the server 3 as a visible object. Points or lines drawn as mentioned above are managed in the form of noun objects. Processing performed on the individual noun objects are given in the form of verb objects.

The communication manager 10 manages correlations between data so as to maintain the expansibility of the extensible WELL system. The data is therefore managed in a centralized fashion using templates. Attributes can be set freely in the templates.

Figure 6:
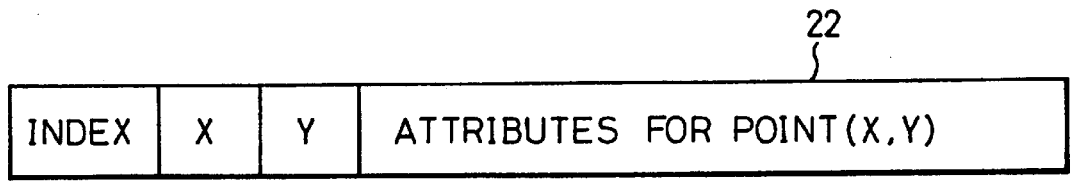
FIG. 6 is a diagram showing an example of a template.

FIG. 6 shows an example of a format of a template. A template 22 is composed of an index field containing an index assigned to each object associated with the template, a coordinate field containing coordinates of the object, and an attribute field containing attributes of the object. Note that a combination of data having a data structure of the above template and representing the correlation between a visible object appearing in a common platform and data handled within a server may also be referred to as a template. Templates are managed on the basis of indices by the service modules 17-*i*. What a client enters through the data window 9 is coordinates indicated in the data window 9. The service modules 17-*i* cannot retrieve an index of a template using coordinates. The communication manager 10 therefore converts coordinates into an index and delivers the index to the service modules 17-*i*.

Figure 7:
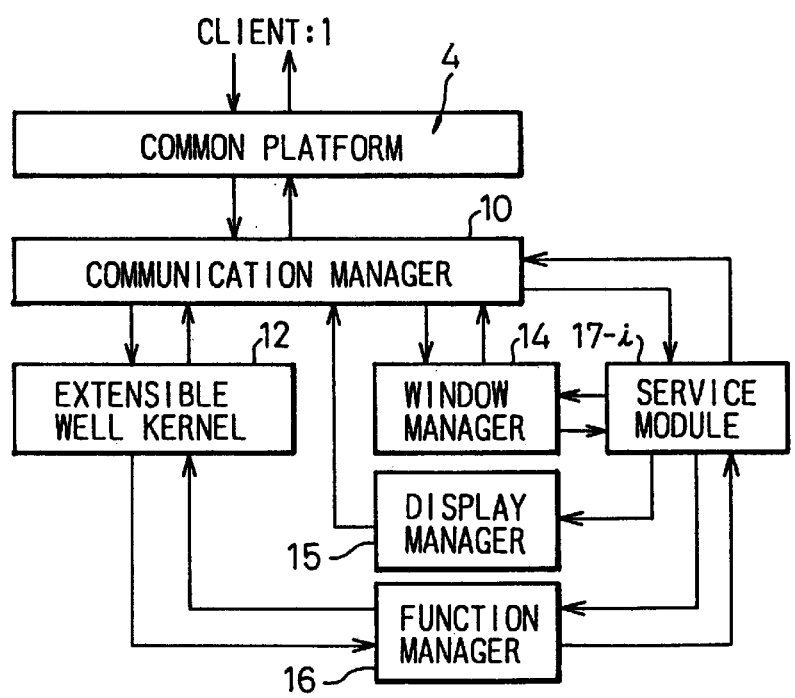
FIG. 7 is an explanatory diagram concerning a role of a communication manager.

FIG. 7 shows a role of the communication manager 10. In FIG. 7, reference numerals denote the same components as those in FIG. 1. As shown in FIG. 7, when a client's intention is to be input to the system via the common platform 4, it is first fed to the communication manager 10 without fail and then transferred to the kernel 12, managers 14 and 16, and then service modules 17-*i*. The communication manager 10 is therefore a sole manager directly connected to the common platform 4 and manages interactive processes in a centralized fashion.

Figure 8:
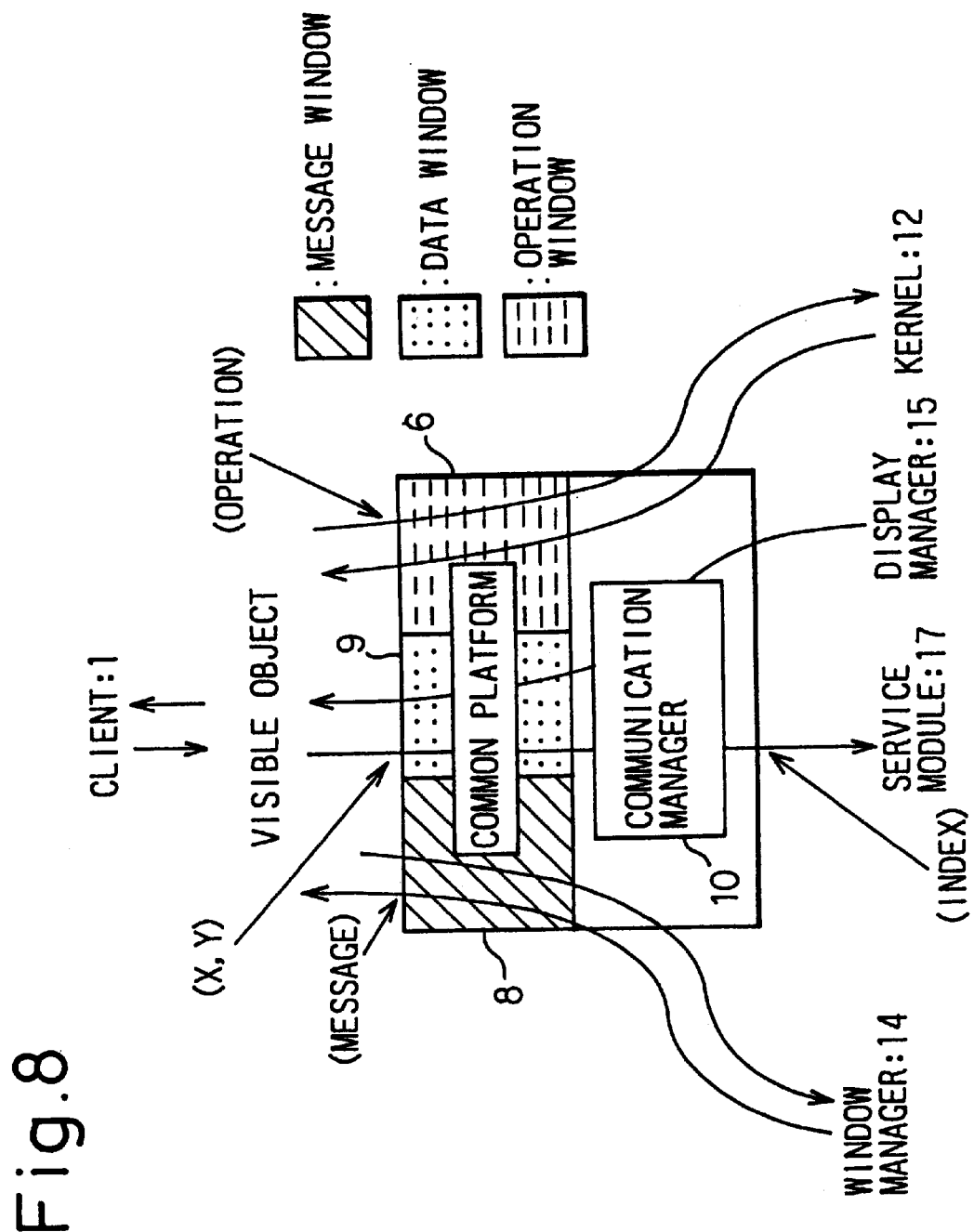
FIG. 8 is an explanatory diagram concerning the operations of the communication manager.

FIG. 8 shows the actions of the communication manager 10. In FIG. 8, reference numerals 6, 8, 9, 10, manager 10. In FIG. 8, reference numerals 6, 8, 9, 10, 12, 14, 15, and 17 denote the same components as those in FIG. 1.

A point (x,y) designated by a client is transferred to the communication manager 10 through the data window 9. A message is transferred through the message window 8. An operation is transferred through the operation window 5. The information is transferred among the managers 14 and 15, kernel 12, and service modules 17 via the communication manager 10.

The template shown in FIG. 6 is used for point or line data, or graphic or image data. This means that the point or line data and graphic or image data is handled in the common platform. The data is represented in the form of noun objects serving as nodes in an object network. When a client wants to render or reference data, he/she uses a mouse or the like to point to a reference of data appearing in the common platform 4 and references or designates a noun object in the object network. This kind of reference designation ability is intended mainly to enable a client to designate data serving as an objective of a verb object. For rendering an entity, an actual point, line, graphic, or image is displayed as an resultant drawing provided by the server in the common platform 4. For storing and processing data, the server processes data stored in line with a specific data structure (for example, an indexed list structure or a raster structure).

Figure 9:
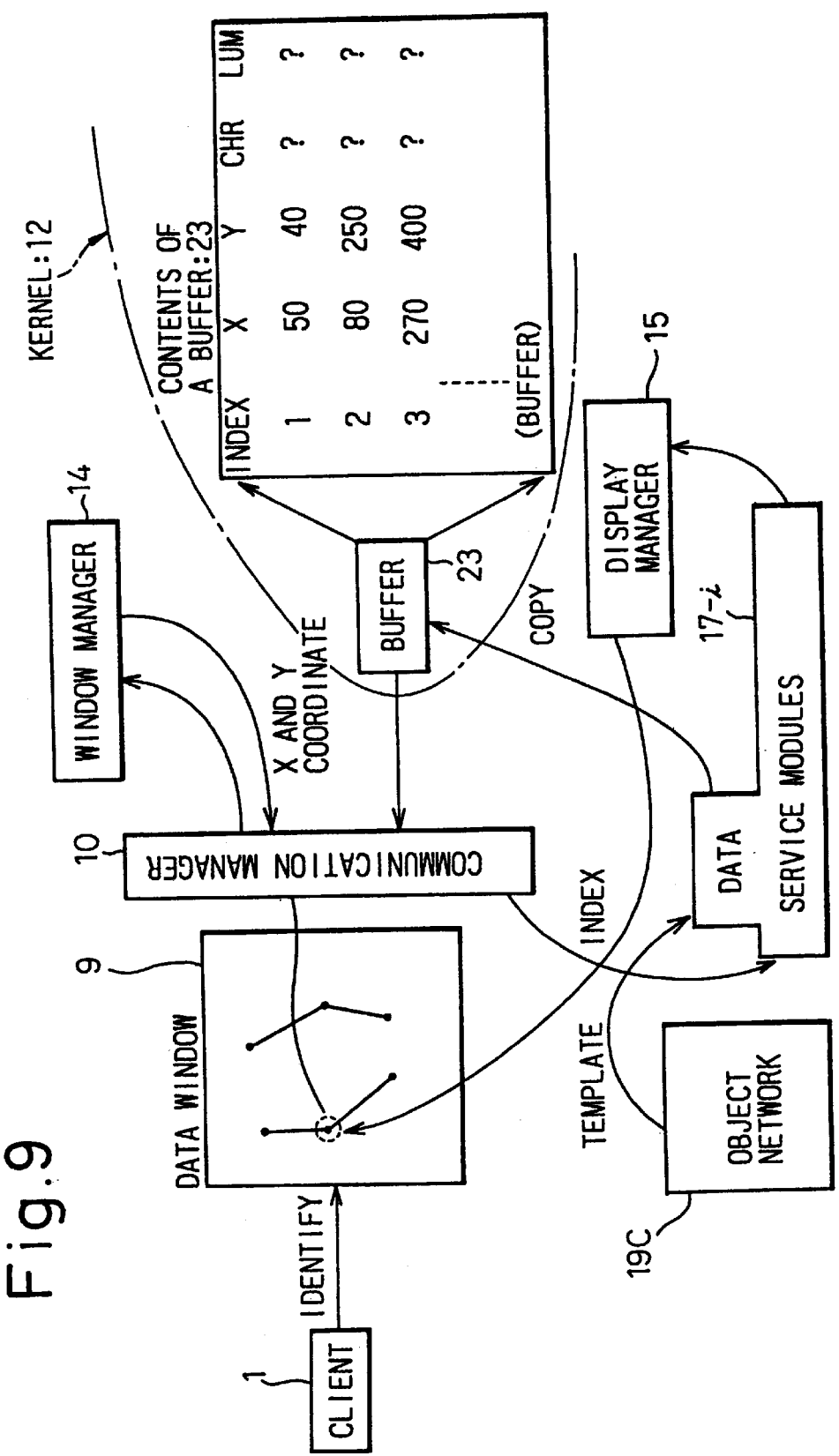
FIG. 9 is an explanatory diagram concerning the roles of the communication manager and template.

Referring to FIG. 9, the effects of the communication manager 10 and a template will be described using an example.

Reference number 9, 10, 12, 14, 15, and 17-*i* denote the same components as those in FIG. 1. Reference numeral 23 denotes a work buffer installed in the kernel 12. 23' denotes an example of the contents of the buffer 23. 19C denotes an object network.

Assuming that color image producing/coloring is in progress, the object network 19C dedicated to the color image producing/coloring supplies templates associated with points and lines as data to a service module 17-*i* concerned. Copies of the templates are written in the buffer 23 (which may reside in the communication manager 10) in the kernel 12 by the service module 17-1 in such a format as the contents 23' of the buffer shown in FIG. 9. The contents of the buffer 23 include, for example, (i) a point specified with an index 1 and characterized by coordinates (50, 40), and uncertain (expressed with ?) chromaticity and luminance (attributes), (ii) a point specified with an index 2 and characterized by coordinates (80, 250) and uncertain chromaticity and luminance, and (iii) a point specified with an index 3 and characterized by coordinates (270, 400) and uncertain chromaticity and luminance.

In this state, when the client 1 designates coordinates (80, 250) through the data window 4 so as to specify one point, the communication manager 10 detects the client's entry. The window manager 14 detects the coordinates and posts them to the communication manager 10. The communication manager 10 retrieves an index associated with the coordinates (80, 250) of the specified point. In other words, the communication manager 10 references the buffer 23 to find that a template containing the coordinates (80, 250) has the index 2. The communication manager 10 then proceeds to a subsequent transaction.

Coordinates transferred are collated with templates from which coordinates of principal points defined using the frame section are copied to a work space. When identical or similar coordinates are retrieved, an index associated with the coordinates is specified. The communication manager 10 sends the index to the service module 17-*i* concerned and thus passes control thereto. The service module 17-*i* updates values in the template specified with the index. For example, coordinate values are modified or a luminance value is described as an attribute. The updated template is converted into a visible object by the display manager 15 and rendered in the data window 9. In this case, the defined point is highlighted so that it will be easily discernible by a client. The extensible WELL system exchanges information with the service modules 17-*i* that manage data on the basis of indices. This system configuration realizes a highly expansible system independent of a specific field, and provides an environment in which irrespectively of a field, a client can respond to intentions of a server while viewing visible objects produced by the display manager 15.

Figure 10:
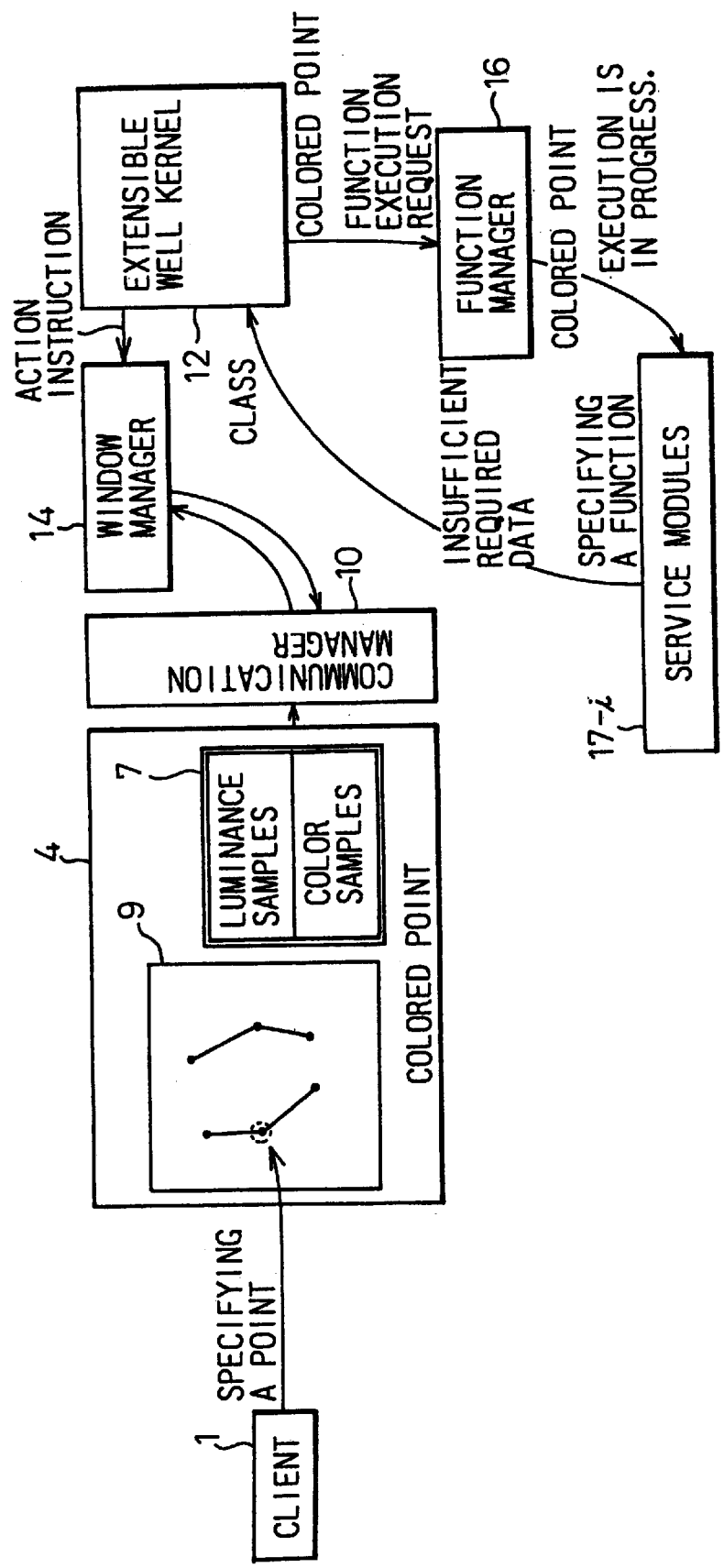
FIG. 10 is an explanatory diagram concerning information exchange.

FIG. 10 is an explanatory diagram concerning information exchange. Reference numerals 1, 4, 7, 9, 10, 12, 14, 16, and 17 denote the same components as those in FIG. 1.

When transferring information to or from a server, a client uses windows without any exception. The system must therefore stay in a wait state so as to pass control through windows. When driven with a client's intention, the system is said to be event-driven. When waiting for data to be entered through a window so as to pass control, the system is said to be data-driven. For example, when Colored Point is selected, the system is "event-driven." However, unless luminance or chromaticity data is given, any function cannot be executed, the system enters a wait state. In this state, the system is said to be "data-driven."

In FIG. 10, when the client 1 designates a point of certain coordinates and thus places the system into the event-driven state, as described in conjunction with FIG. 9, the window manager 14 informed of the fact by the communication manager 10 reports the coordinates (for example, (80, 250)). The associated index 2 is then checked, and a template specified with the index is posted to the service module 17-*i* concerned.

When the client 1 wants to color the point, the kernel 12 analyzes the state of noun object Colored Point shown in FIG. 4. After completing the analysis, the kernel 12 issues a function execution request to the function manager 16. In response to the request, the function manager 16 specifies a function according to provided constraints. The service module 17-*i* concerned determines if the function is executable. If data is insufficient to execute the function, required work is performed via the kernel 12. For example, when the service module attempts to input luminance or chromaticity information to the template representing the point specified by the client, if the luminance or chromaticity information is uncertain, the function cannot be executed. The system then becomes data-driven. The command window 7 needed for data input is opened, and luminance samples or color samples are displayed in the command window 7. The system thus waits for client's entry.

The service module 17-*i* concerned opens a required window (for example, the command window 7 in FIG. 10) and waits for a user's response. The command window 7 may become unnecessary after the response is received. Some service modules require numerous windows. The number of windows to be opened must be minimized. The window manager 14 is therefore provided with a table listing states of windows. Based on the contents of the table, unnecessary windows are deleted automatically.

Figure 11:
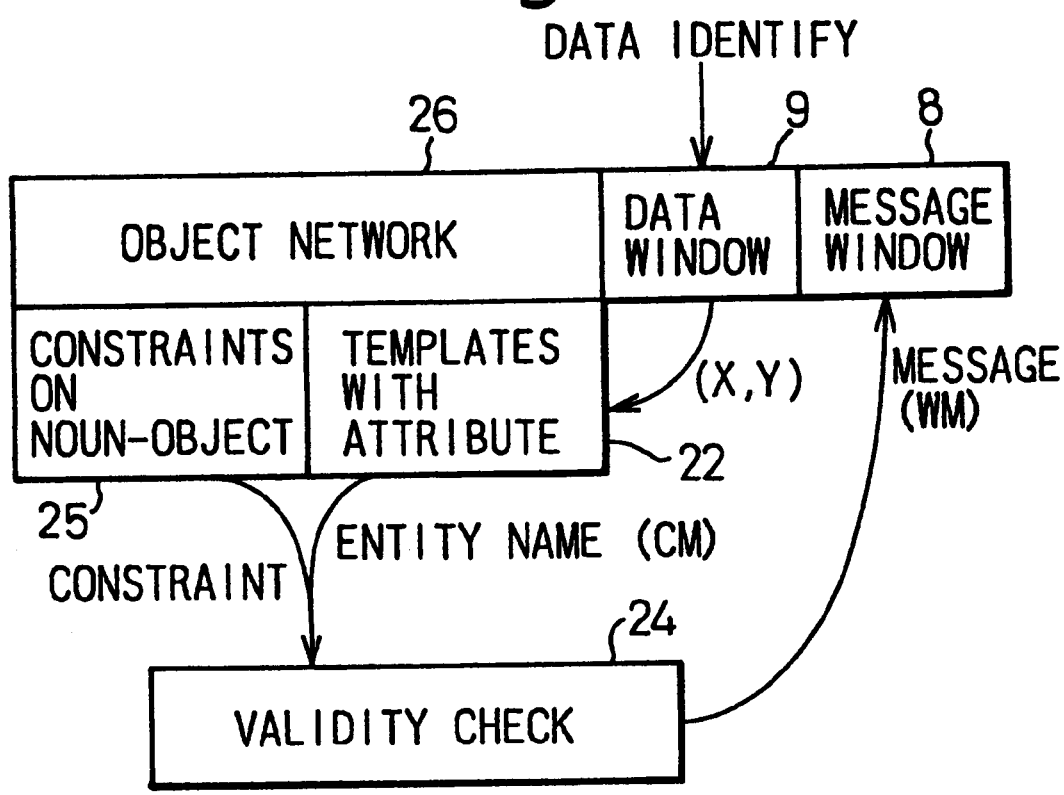
FIG. 11 is an explanatory diagram concerning the operations of a check module.

FIG. 11 is an explanatory diagram concerning the actions of a check module. Reference numeral 8 denotes a message window. 9 denotes a data window. 22 denotes a template. 24 denotes a check module. 25 denotes constraints. 26 denotes an object network.

A client may want to check the validity of data he/she has produced through a data window in the course of work on an object network. An item the client wants to check is regarded as one constraint. The constraints 25 are appended to each of noun object in the object network 26. The server achieves checking by comparing the contents of a template with the constraints. What counts here is how a server identifies a template to be processed. The extensible WELL system utilizes the capability of a communication manager for the identification. The communication manager 10 manages the consistency in data between a client and a server on the basis of the data contained in a template residing in an object network. Based on coordinates (X, Y) of a point a client specified by clicking a mouse, as described with reference to FIG. 9, information specifying an object to be processed is retrieved from the template 22 and transferred to the check module 24 (that is a service module for collating the contents of a template with constraints). Based on the information, the check module determines whether the constraints are satisfied. The result of the determination is posted to the client through the message window. The checking performed by the check module 24 is utilized to check if a status shift from Point to Colored Point is achieved correctly. Another constraining jobs can, similarly to another service modules, be implemented by preparing responsible managers.

Figure 12:
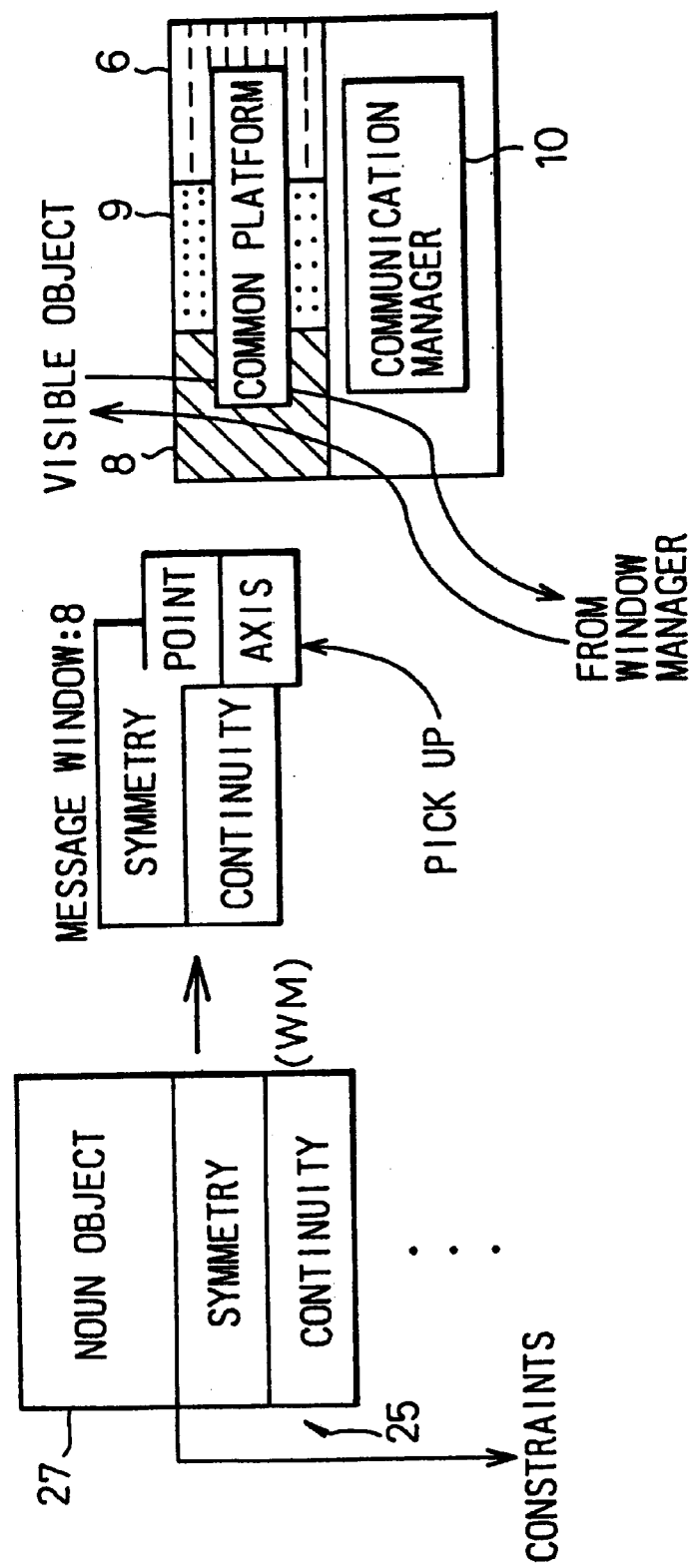
FIG. 12 is an explanatory diagram concerning display form for constraints.

FIG. 12 shows a mode of rendering constraints. Reference numerals 6, 8, 9, and 10 denote the same components as those in FIG. 1. Reference numeral 25 denotes constraints shown in FIG. 11. 27 denotes a noun object.

It may become necessary to inform a client of constraints appended to a line (segment) drawn during graphic drawing. The actions of managers in this state will be described in conjunction with FIG. 12.

The line (segment) itself represents the state of data and is therefore regarded as one noun object 27. The constraints 25 are appended to the noun object 27. The constraints 25 that can be imposed on a line (segment) may be continuity and symmetry (indicating whether a segment is symmetric with respect to an axis or a point).

The constraints 25 appended to the noun object 27 are rendered in the message window 8 via the communication manager 10 and thus reported to a client. In FIG. 12, "Symmetry-Point, Axis" shown as the contents of the message window 8 is an indication asking which be realized; point symmetry or axial symmetry. A client picks up either "Point" or "Axis" of the "Symmetry-Point, Axis" so as to post his/her intention to the server.

In response to an activation request entered by a client through the message window 8, the check module 24 shown in FIG. 11 is activated by the function manager 16 (FIG. 1). The check module 24 uses the message window 8 to issue an identification request to the client. The client selects a visible object through the data window by clicking the mouse, thus transferring data concerning the object to the communication manager 10. The data is converted into an index of an item associated with the object as shown in FIG. 9 by the communication manager 10, and then sent to the check module 24. Using the index, the check module 24 retrieves attributes from a template specified with the index and checks it. The result of the checking is posted to the client through the message window.

Figure 13:
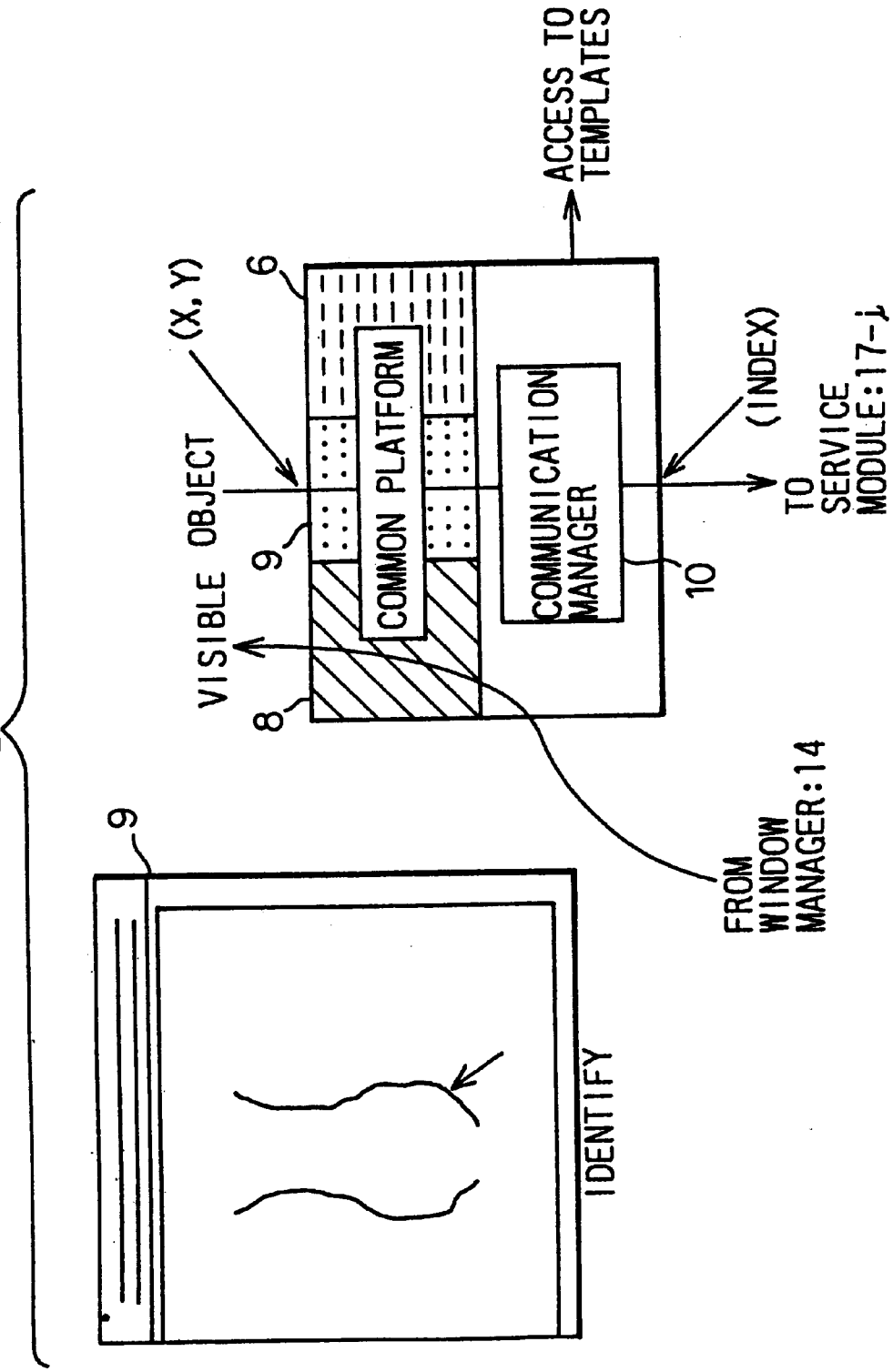
FIG. 13 is an explanatory diagram concerning identification.

FIG. 13 is an explanatory diagram concerning identification. Reference numerals 6, 8, 9, 10, 14, and 17-$i$ denote the same components as those in FIG. 1.

As described above, when the check module 24 issues an identification request to a client, the client designates, for example, a segment as shown in FIG. 13 through the data window 9. Responsively, the window manager 14 operates to post relevant data to the communication manager 10. The communication manager 10 becomes aware of an associated index and transfers the index to the check module 24. The check module 24 then, as shown in FIG. 11, checks the data specified with the index. The result of the checking is rendered in the message window 8.

Next, an interactive information system having an agent capability in accordance with the second embodiment of the present invention will be described.

Figure 14:
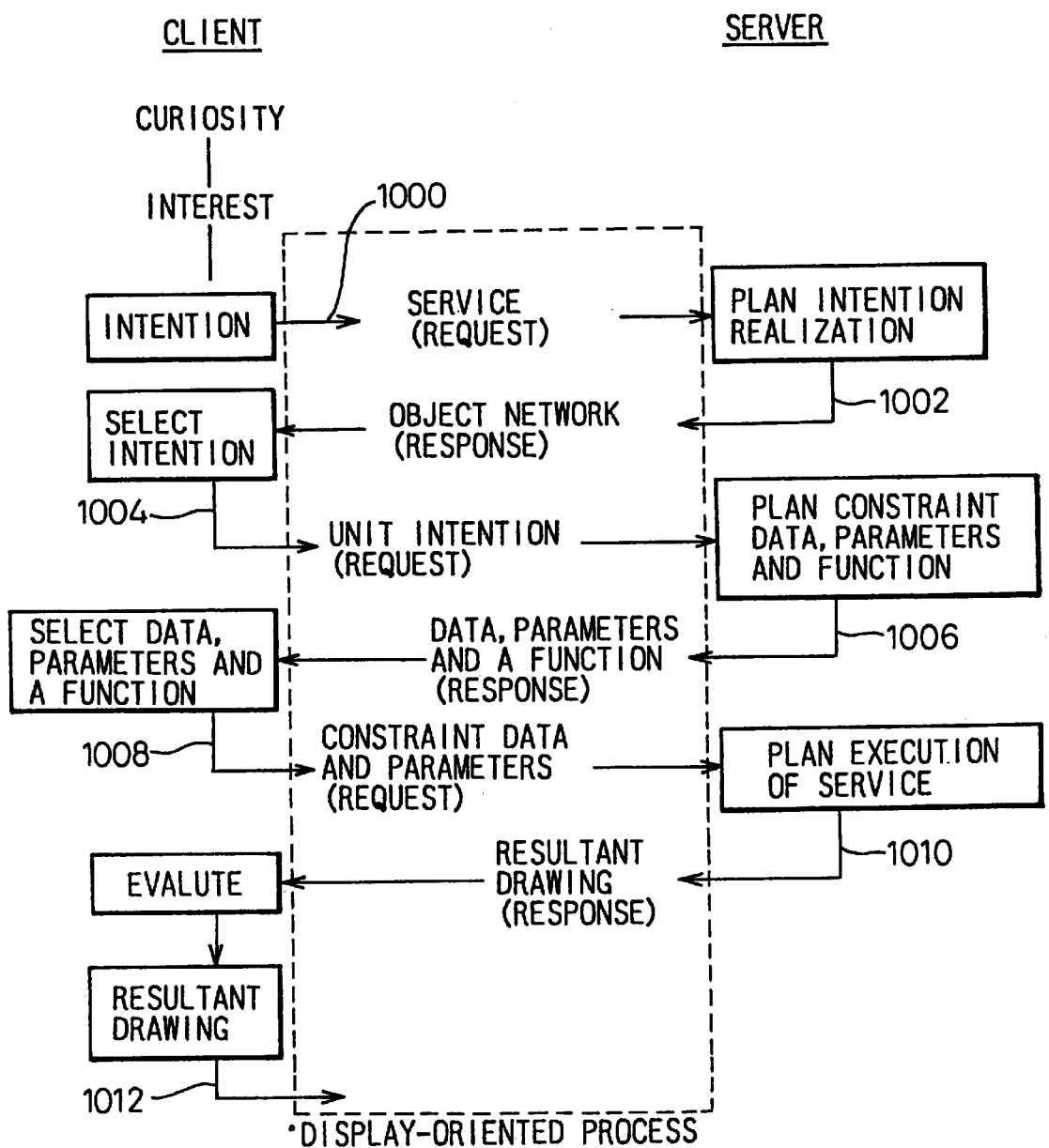
FIG. 14 is a diagram showing an interactive model between a client and a server.

For solving certain problems and obtaining results of processing, a service system is used to realize an intention induced by curiosity. Thinking of an interactive model between a client and server shown in FIG. 14, it may be worth while defining an organization of intentions in the form of a graph-structure object network. The contents of the object network are expressed as an interactive sequence in which services are executed sequentially or in parallel to realize individual intentions. In the left-hand of FIG. 14, work performed by a client is indicated with rectangles. In the right-hand thereof, jobs performed by a server are indicated with rectangles. In the center of FIG. 14, a rectangle drawn with a dashed line means that a display-oriented process including a display facility such as a display unit is interposed between the client's work and server's jobs.

A client enters the name of a service interesting him/her so as to express his/her intention, and thus requests a display-oriented process to execute the service (step 1000). In response to the request, a server plans intention realization and provides an object network used for transactions (step 1002).

While viewing the provided object network in a screen, the client selects an intention (step 1004). The selected unit intention is fed to the server. The server in turn plans constraint data, parameters, and a function, and then presents the resultant plan in a screen (step 1006).

The client selects the presented data, parameters, and function (step 1008). The server plans service execution on the basis of the selected data, parameters, and function, and presents a resultant plan in a screen (step 1010). The client evaluates the resultant plan and then selects a subsequent intention (step 1012).

As mentioned above, the client and server cooperate with each other so as to realize intentions. In other words, the client requests the server to provide unit intentions while selecting intentions. Responsively, the server plans constraints required for service execution and informs the client of the necessities of the constraint plans. This kind of interactions are characteristic of an interactive system.

For more effectively realizing the interactions between a client and a server such as the ones shown in FIG. 14, it may worth while interposing an agent-role server 3' playing the role of an agent between a client 1 and specific role servers 3".

The agent-role server 3' plans a service according to an intention of the client 1 (step 1100), retrieves a specific role server for executing the service plan (step 1101), plans service assignment, and makes a request for executing the service plan by means of a subordinate display-oriented process 2—2 (step 1102). The specific role server 3" plans execution of the assigned service and supplies the results of execution to the subordinate display-oriented process 202 (step 1104). The agent-role server 3' checks the results of execution and presents the results of execution to the client 1 by means of a display-oriented process 201 (step 1106). The subordinate display-oriented process 202 is designed to be "display-oriented" in an effort to facilitate system development of the specific role server 3" alone. Similarly, the display-oriented process 201 is usable for development of the agent-role server 3'.

Figure 16:
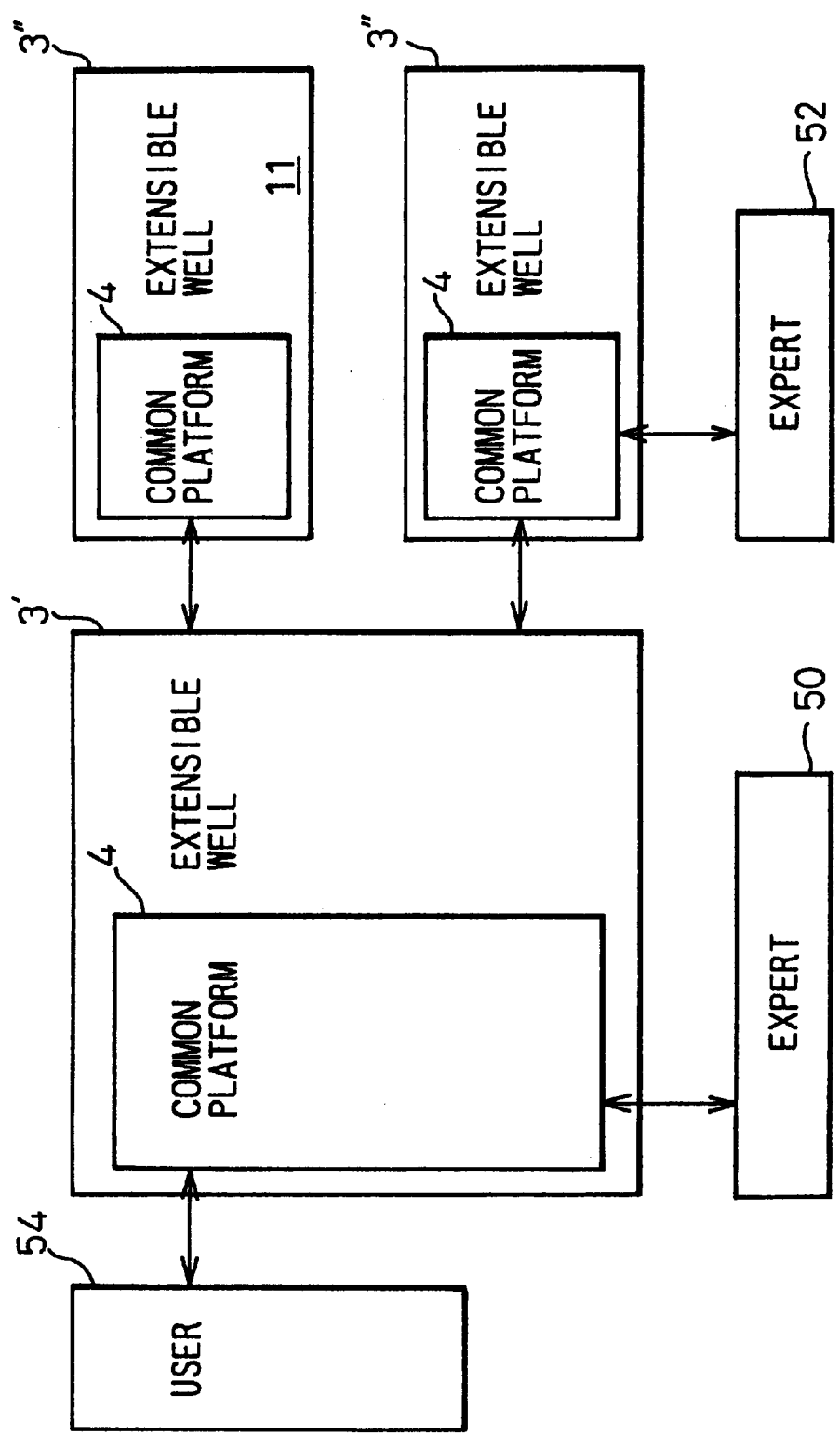
FIG. 16 is a block diagram showing an interactive information processing system with an agent capability in accordance with the second embodiment of the present invention.

FIG. 16 shows the outline configuration of an interactive information processing system having an agent capability in accordance with the second embodiment of the present invention. The interactive information processing system is adapted for the above display-oriented and subordinate display-oriented processes. Each of the agent-role server 3' and two specific-role servers 3" is realized with the extensible WELL system 11, which is described with reference to FIG. 1, having the common platform 4. In system development, a client of the agent-role server 3' is an expert 50 well-familiarized with the jobs of an agent. Clients of the specific-role servers 3" are experts 52 well-familiarized with specific jobs. Each of the experts 50 and 52 designs object networks, templates, constraints, and required service modules through the common platform 4. When a system has been developed and becomes usable, the client of the agent-role server 3' is taken over by a user 54 of the system. The clients of the specific role servers 3" are taken over by the agent-role server 3'.

As described previously, data conversion is performed using a template between the servers 3 and 3" and their clients. Table 1 lists examples of templates.

TABLE 1

| | Client | Server |
|---|---|---|
| Template containing point or line data. | Points or lines are displayed as entities. (entity designation) A template is designated while reference to an entity. (reference designation) | An index is used to specify the template. Data is transferred all together to the common platform and processed in combination. |
| Template containing graphic or image data | Graphics or images are displayed as entities. Reference designation | Data is specified using a list structure or raster structure. |
| Template containing a data element | A name is designated. | A name header is used to specify the template. |
| Template containing a service (Agent service) | A service structure is first designated in the form of a generic object network. During service, a service item or a service name is designated. | A service coordination table is supplied. A server for executing a service or a server responsible for a service is selected. |

Specifically, as far as a template containing point or line data is concerned, a point or line is displayed as an entity so that a client can designate any point or line while referencing the entities. For a server, an index is used to specify a template. Data contained in the template specified is transferred all together or processed in combination. As far as a template containing graphic or image data is concerned, images or graphics are displayed as entities so that a client can designate any image or graphic with reference to the entities. For a server, a list structure or raster structure is used to specify data. As far as a template containing a data element is concerned, a name is used so that a client can designate any template. For a server, a name header is used to specify a template. As far as a template containing a service (abstract service of an agent) is concerned, a service coordination clarifying programs responsible for specific services is presented in the form of a generic object network so that a client can select a desired service. In the course of execution of a service, a client can enter (i) a service item having service constraints as parameters and (ii) a service name. For a server, (i) a service coordination table is produced, and (ii) a server for executing a service according to a service item designated by a client or a server responsible for a service is selected.

In the configuration shown in FIG. 16, the number of specific role servers 3" is not necessarily two but may be one or more than two. The agent-role server 3' and specific role servers 3" may be implemented in individual workstations or personal computers or in a single workstation or personal computer.

In the system shown in FIG. 16, a plurality of services are executed in parallel within the same specific role server or different specific role servers. At this state, constraining relationships among services must be clarified and reflected on transactions, so that transactions processed by a plurality of service modules will be mutually consistent.

Figure 17:
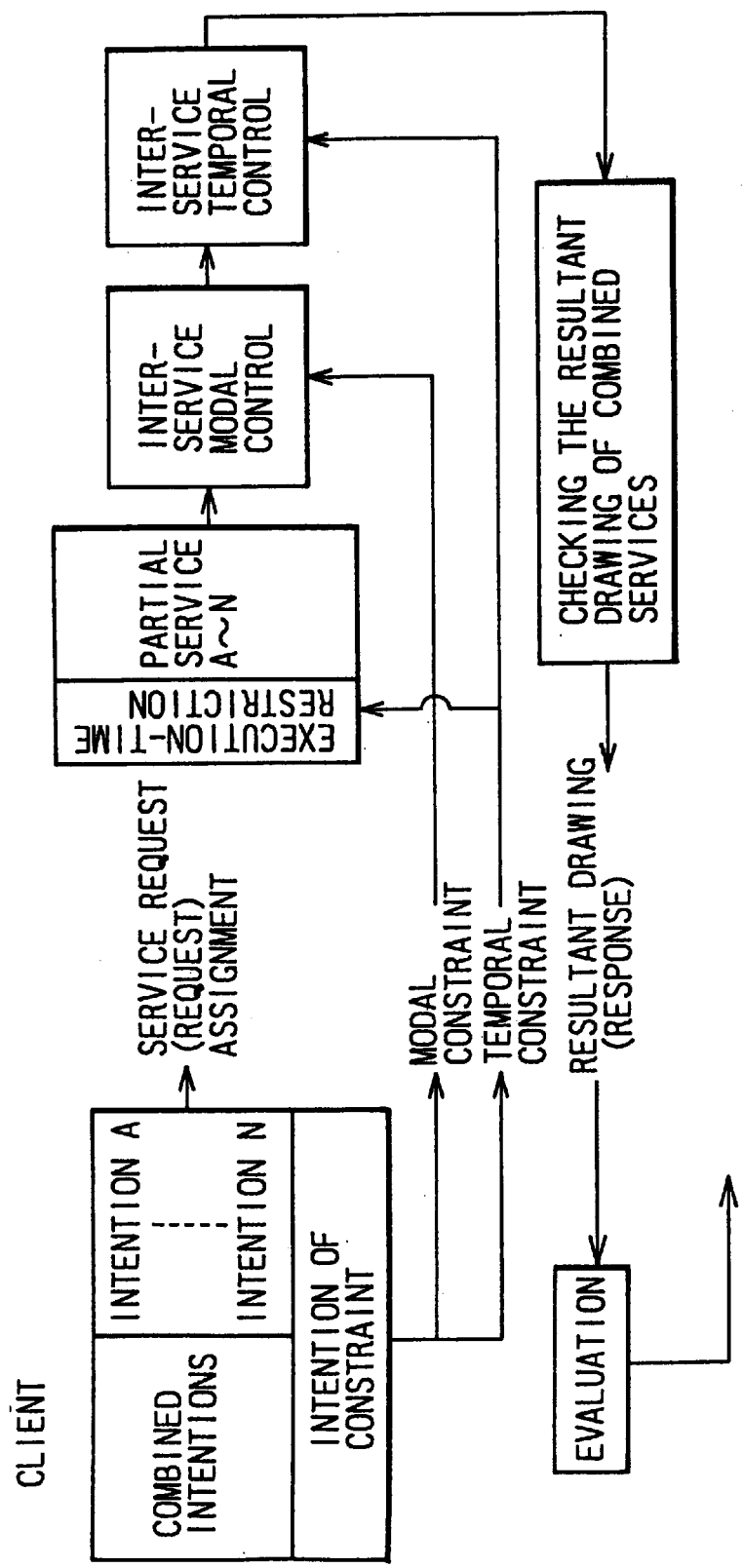
FIG. 17 is a conceptual diagram showing consistency of each transaction.

FIG. 17 conceptually shows a situation in which consistency is attained among transactions. When an attempt is made to execute in parallel services A to N derived from intentions A to N of a client shown in the left-hand part of FIG. 17, constraints are usually imposed on execution of the services. The constraints are classified into temporal constraints and modal constraints. The former is comparable to execution-time restraints or inter-service temporal control, while the latter is comparable to inter-service modal control. The contents of a combined service executed with the restraints imposed or control applied are checked, and the result of checking is presented to a client through a window. The client evaluates the result of checking.

The aforesaid configuration and actions will be described on a supplemental basis using examples.

Figure 15:
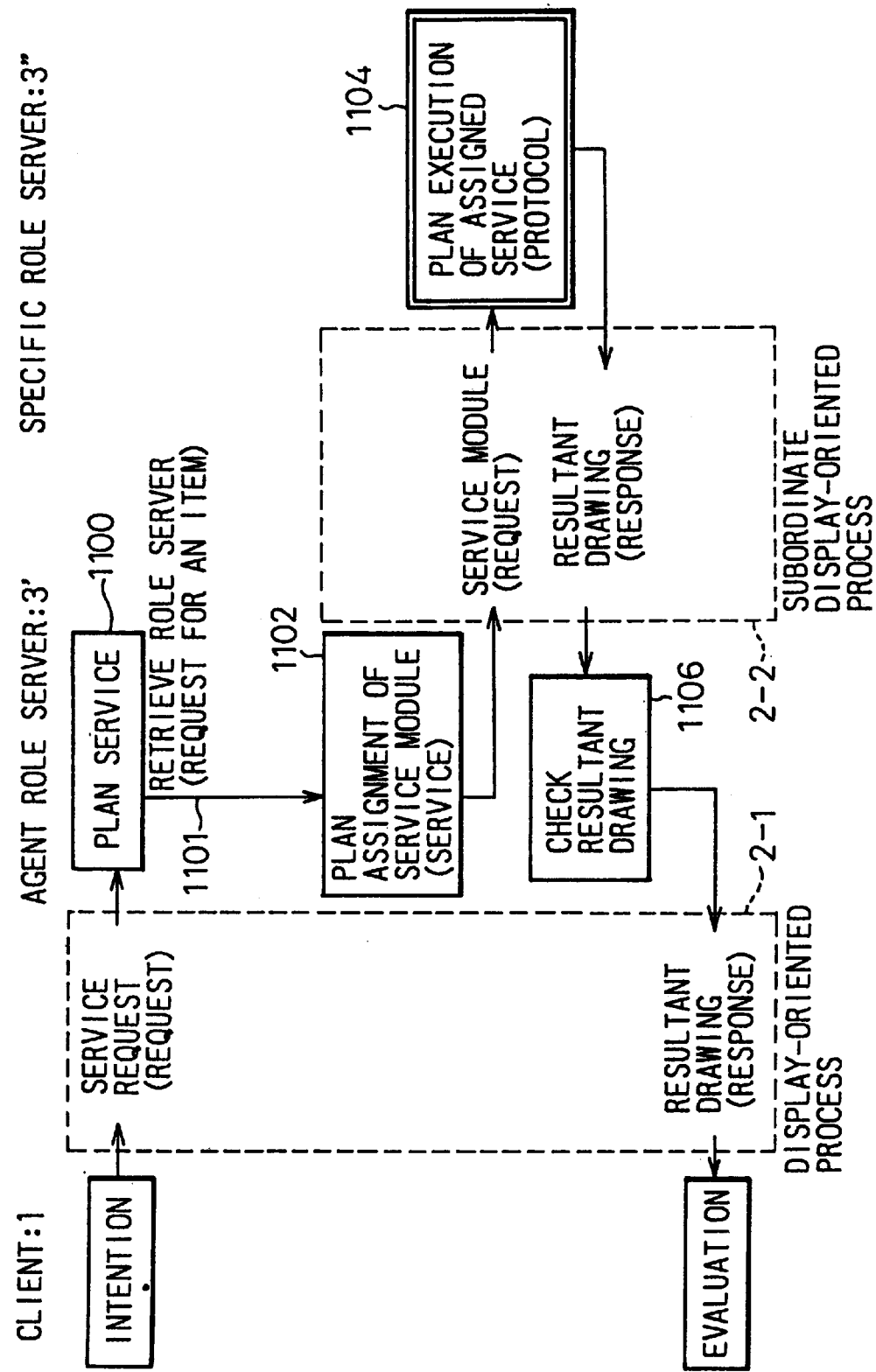
FIG. 15 is an explanatory diagram concerning a role of an agent-role server.

In FIG. 15, the agent-role server 3' plans a service according to an intention of the client 1 (step 1100). For example, when a client has the intention of drawing such a textured picture as a fish having numerous scales, the intention of drawing a textured picture is sent as a service request to the agent-role server 3'. The agent-role server 3' plans a service in which flow lines and cell pictures are drawn and combined to form a textured picture. For drawing flow lines, the element network shown in FIG. 4 can be employed because it is designed to draw element pictures. Specifically, a partial network including noun objects from Point to Line in FIG. 4 is rendered as an object network. For achieving this rendering, the agent-role server 3' retrieves noun object Line to find that a word "flow" resides in the element network. The agent-role server 3' then renders the partial object network together with the display of flow lines in the common platform 2.

Using the partial object network, the client 1 draws curves A and B to outline a fish body as shown in FIG. 18A. Next, as shown in FIG. 18B, the client 1 draws lines C and D. At this time, the agent-role server makes an inquiry "How may lines do you want to draw between line A and B?" through the message window 8. When the client 1 types 5 in response to the inquiry, as shown in FIG. 18C, ten points are determined. Consequently, five interpolative curves are drawn. In response to an inquire "At how many points do you want to dot the interpolative curves?," when 7 is typed, each of the interpolative curves is, as shown in FIG. 18E, dotted at seven points so that scales can be drawn on the points.

Figure 19:
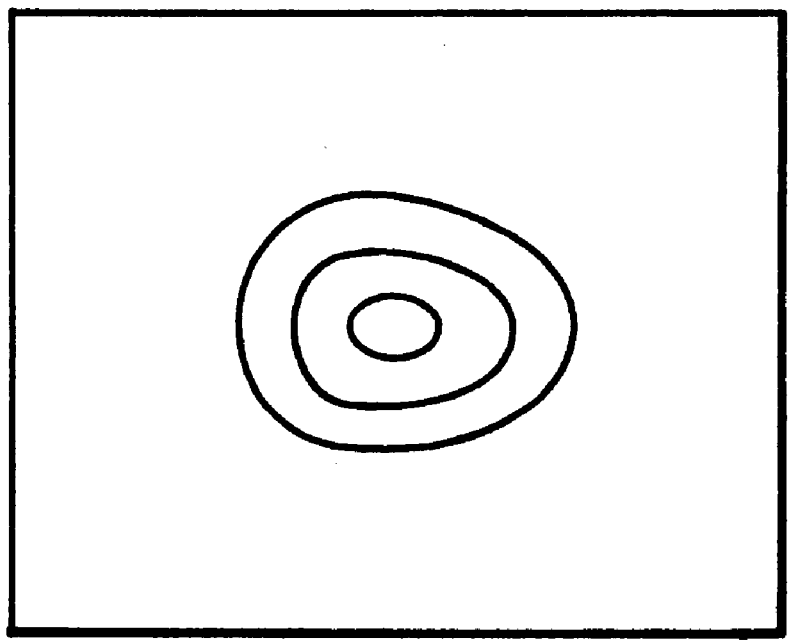
FIG. 19 is a diagram showing an example of a cell picture.

At the same time, an object network serving as an element network is rendered together with a cell picture so that a scale image can be drawn. The client draws a color scale image as shown in FIG. 19 using the object network.

Assignment of a service to a certain specific-role server 3" is performed at step 1102 in FIG. 15 at which service assignment is planned (service specification). At this step, the subordinate display-oriented process 202 whose client is the agent-role server 3' provides predetermined display. Consequently, the agent-role server 3' communicates with the specific role servers 3". When the agent-role server 3' communicates with the plurality of specific role servers 3", in this example, when flow lines and a cell picture are processed, constraints must be stipulated in advance between the specific role servers 3" and observed for execution of a service.

It is therefore required to define templates in advance. A point template is defined as shown in FIG. 6. A field of "attributes for point (x,y)" in FIG. 6 contains attributes of luminance and chromaticity of the point concerned. A line template is, as shown in FIG. 20, composed of templates associated with principal points 1, 2, etc., and n among points at which the line intersects scanning lines (See FIG. 10) and pointed to by pointers.

In FIG. 20, each point template specifies a luminance and a chromaticity vector as attributes. This is because when an element network that is an object network having noun objects Point and Colored Point defined is employed, it is preferable to set a luminance or chromaticity vector as attributes in a point template so that the meaning of a modifier "colored" can be expressed.

With the addition of an adjective "flow" to a noun "line," an area for accommodating an additional attribute must be defined in a template. The area may be defined in advance. Alternatively, when needed, the area may be defined using a graph-structure editor, which is an extension feature for expanding the capability of the extensible WELL system.

Figure 21:
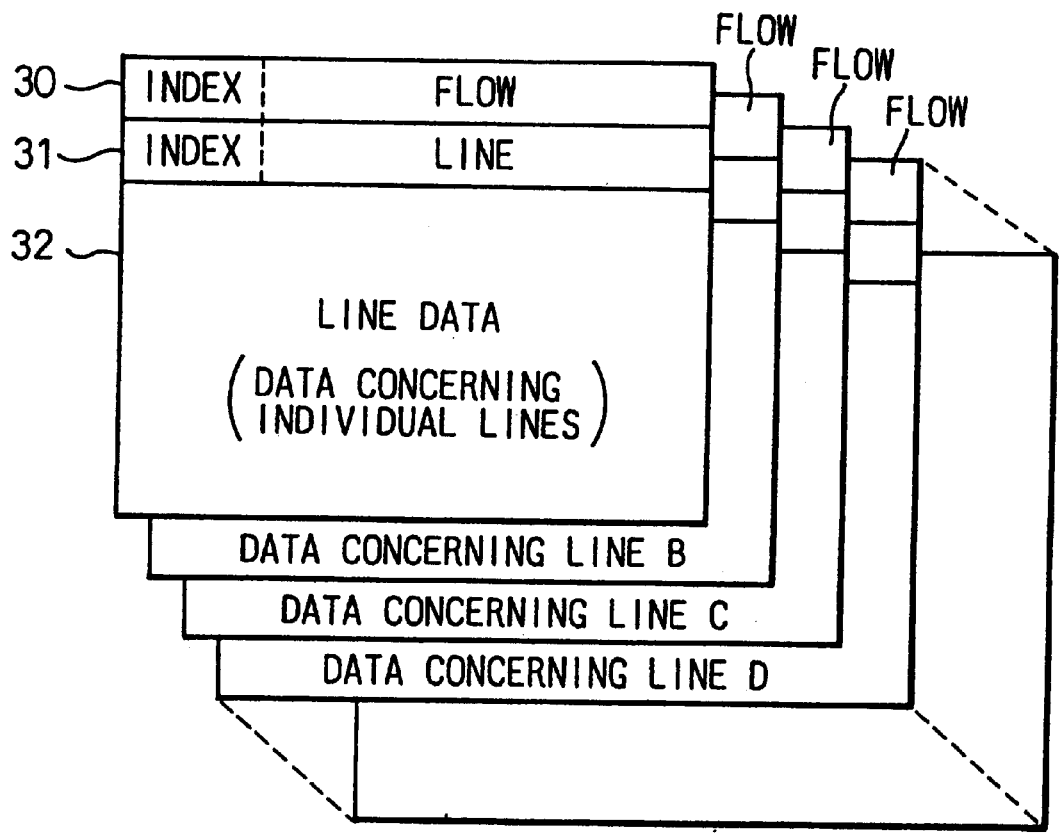
FIG. 21 is a diagram showing templates for lines with a modifier "flow" appended.

An example of a data structure for data with an adjective such as a flow line is shown in FIG. 21. In FIG. 21, reference numeral 30 denotes an index associated with an "adjective distinguishing a line" such as "flow." 31 denotes an index associated with a "line" specified with "flow." 32 denotes data (such as the one shown in FIG. 20) concerning the "line."

Figure 22:
FIG. 22 is a diagram showing an attribute field in a template for coping with a modifier "featured"

When an adjective "featured" is appended to "colored point" to form "featured colored point," a "Feature name" area as shown in FIG. 22 is defined in an attribute field of a colored point template. "Edge," "highlight," or "none" is described in the "Feature name" area. When "edge" is described, the point is recognized to belong to an edge in terms of the luminance and chromaticity vector. When "highlight" is described, the point is highlighted. When "none" is described, the point has no feature.

For four lines A, B, C and D shown in FIGS. 18A and 18B, four line templates are prepared. Through the message window 8 in the common platform 4, the client 1 makes a request for producing line templates associated with five flow lines. In the course of drawing a cell picture, a template is produced in association with a noun object selected in an object network (such as the one shown in FIG. 4). When noun object Colored Region is selected, a raster-structure template having luminance and chromaticity data is produced.

The center of each scale image drawn as mentioned above is aligned with each of dots on flow lines. The size of each scale image is then determined, and then the scale images are mapped. In this case, constraints are required.

By this time, a distance between adjoining dots on the flow lines is determined for the dots. "Distance" is defined as an attribute of a flow line. A value of a distance is calculated after drawing is completed. The distance value is stored in a point template for each dot. Similarly, "scale" is defined as an attribute of a cell picture. A constraining relationship between the scale value and distance value is determined as "a diameter of a scale in a cell picture=a distance between adjoining dots on a flow line." The specific role server 3 is asked to achieve mapping while keeping the relationship.

FIGS. 23A, 23B, 24A and 24B are flowcharts describing textured picture drawing.

The work of the client 1 is described sequentially from above in the left-hand parts of FIGS. 23A, 23B, 24A and 24B. The jobs of the agent-role server 3' are described sequentially in the center parts of FIGS. 23A, 23B, 24A and 24B. The jobs of the specific-role server 3" are described sequentially from above in the right-hand parts of FIGS. 23A, 23B, 24A and 24B. In FIGS. 23A, 23B, 24A and 24B, reference numerals 1, 2-1, 2—2, 3' and 3" denote the same components as those in FIG. 15. An arrow A in the bottom of FIG. 23B points to an arrow A in FIG. 24A.

Figure 23B:
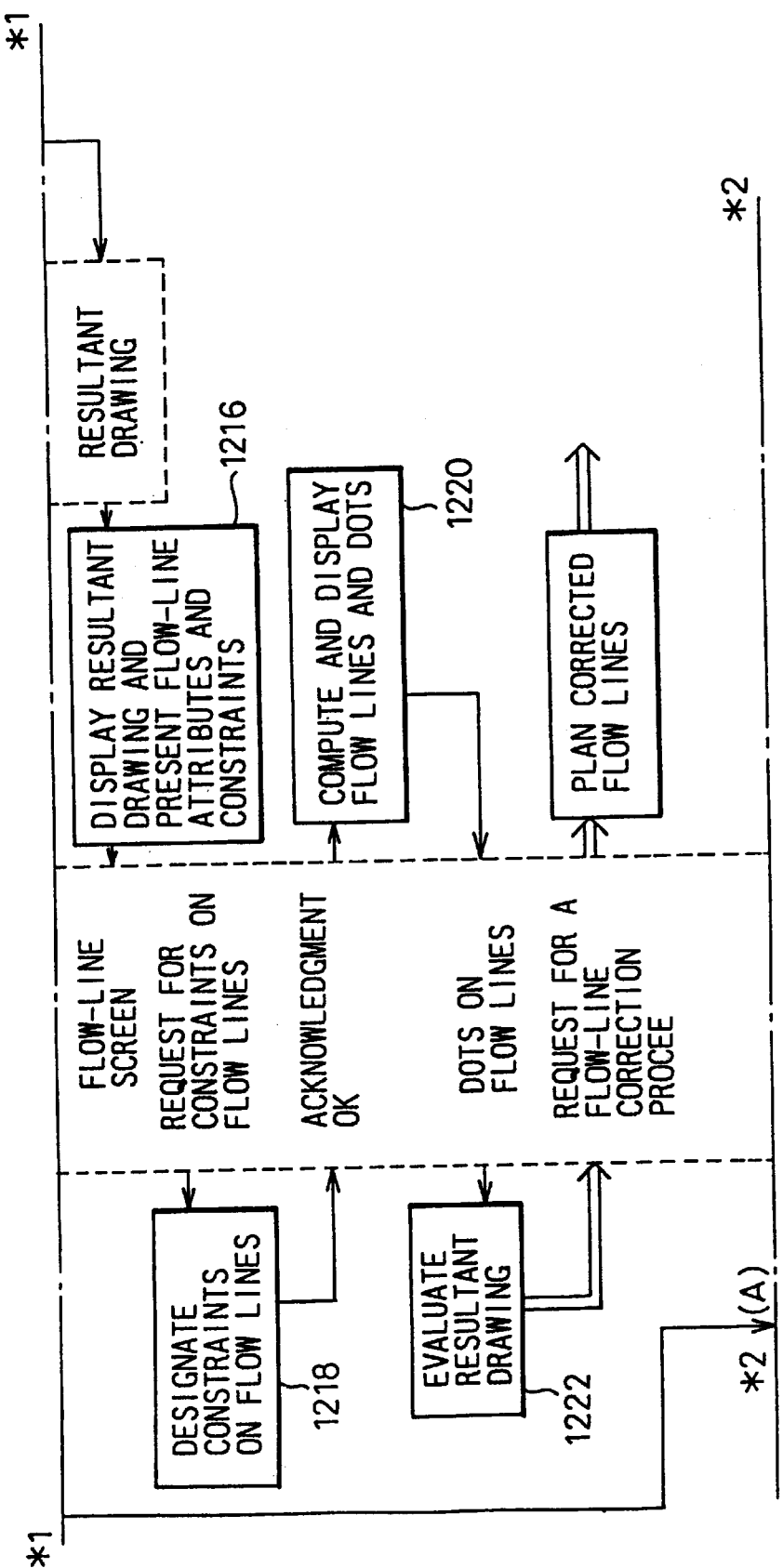

In FIGS. 23A and 23B, the client 1 having the intention of drawing a textured picture makes a request for a textured picture drawing service (step 1200). The agent-role server 3' plans a textured picture drawing service (step 1202), and sets an integrated service platform (step 1204). The client 1 who wants to display flow lines such as those shown in FIG. 18D makes a request for displaying flow lines (step 1206).

The agent-role server 3' retrieves a flow-line drawing plan (step 1208) and requests the specific role server 3" to set a flow-line drawing service (step 1210). The flow-line drawing service set by the specific role server 3" is presented to the client 1 via the agent-role server 3' (step 1210). The client 1 having the intention of drawing flow lines makes a request for displaying a flow-line screen (step 1212). The agent-role server 3' requests the specific-role server 3" to display the flow-line screen (step 1214). The flow-line screen is then displayed for the client 1 and constraints are presented at the same time (step 1216). When the constraints are acknowledged (step 1218), the agent-role server 3' performs computation so as to display flow lines and dots (step 1220), and then displays them for the client 1. The client 1 makes a correction request if necessary (step 1222).

Figure 24A:
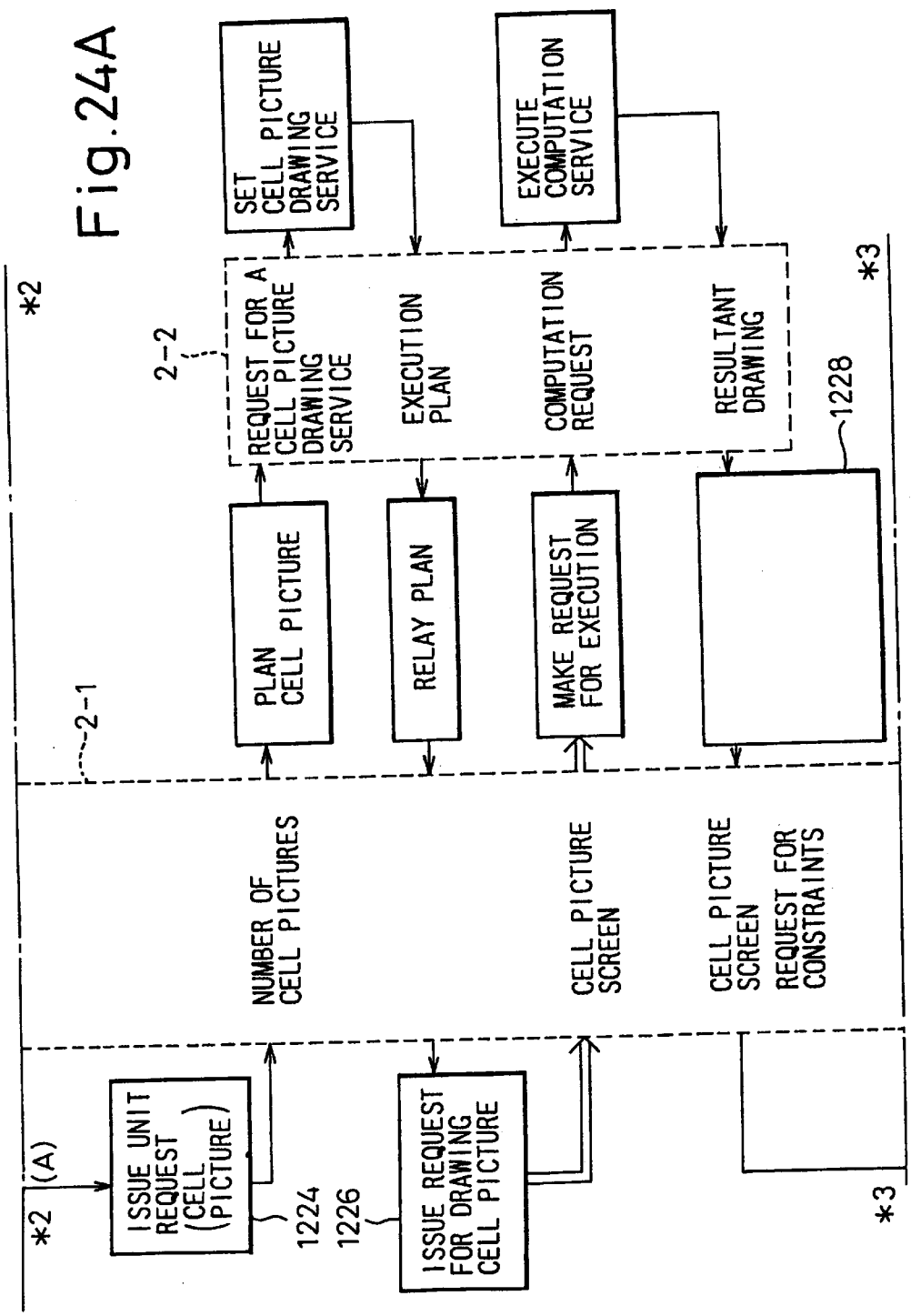

The client 1 then expresses the intention of drawing a cell picture (step 1224). As shown in FIGS. 24A and 24B, the agent-role server 3' and specific role server 3" work together to set a common platform for a cell picture. When the client 1 expresses the intention of drawing a cell picture (step 1226), a cell-picture screen is displayed and constraints are presented (step 1228). When the client acknowledges the constraints (step 1230), the results of processing the cell picture are integrated into the integrated service platform. Thus, the system waits for the client 1 to evaluate the results of processing.

As mentioned above, two jobs of flow-line drawing and cell-picture drawing can be executed in parallel. When the drawing is completed, an integrated drawing process is started. The specific role servers 3" that are three servers for flow-line drawing, cell-picture drawing and integrated drawing is subordinated to the agent-role server 3'. The element network shown in FIG. 4 is used as an object network for controlling the servers. For flow-line drawing, noun objects from Noun to Line shown in the left-hand part of FIG. 4 are employed. These noun objects alone are rendered in the common platform for the sole purpose of line drawing and used by the client 1 within the display-oriented process 201. For cell-picture drawing and integrated drawing, the whole of the element network shown in FIG. 4 is used as an object network by the client.

The results of processing performed by the specific-role servers 3" are displayed in the common platform interposed between the client 1 and agent-role server 3' via the agent-role server 3'.

Notes on interactions are as follows:

(1) An abstracting service provided by the agent-role server 3' is defined in the form of a generic object network. The generic object network is specified as a specific object network by appending parameters or constraints.

(2) Using attributes of individual objects received from a parent server (for example, agent-role server 3'), the specific role server 3" executes a job. As a result, the attributes are delivered as synthesized attributes to the parent server. The agent-role server 3' uses the attributes to impose constraints, obtain new data, or activate a checking facility.

(3) Constraints fall into, as shown in FIG. 17, modal constraints and temporal constraints.

The generic object network resembles the element network shown in FIG. 4. For drawing a textured picture, a client issues a request for drawing a textured picture to the agent-role server 3'. A generic object network provided by the agent-role server 3' is set as an integrated service platform in order to facilitate communication between the client 1 and the agent-role server 3'. The aforesaid pictures are displayed in the integrated service platform. This kind of network is produced by the graph-structure editor serving as a facility of the extensible WELL kernel.

Figure 25:
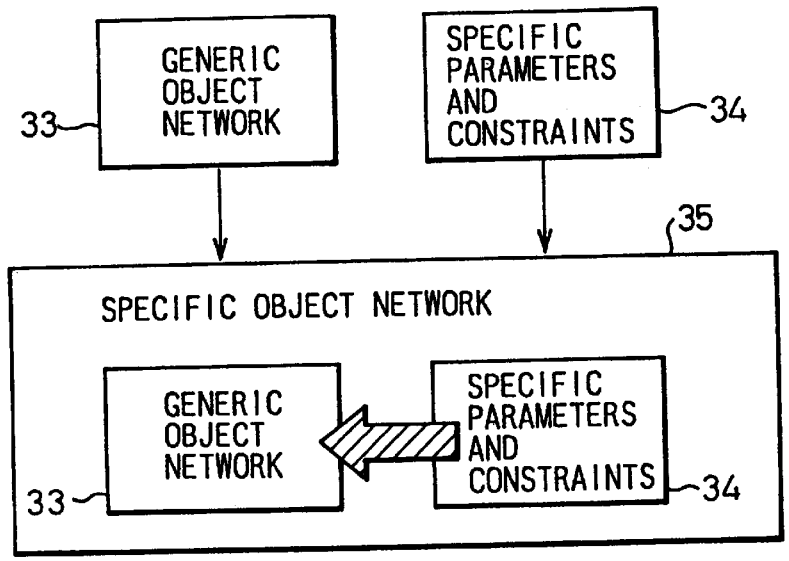
FIG. 25 is a diagram showing a hierarchical structure of an object network.

FIG. 25 shows a hierarchical structure consisting of object networks. As variables are generalized to create a formula in the field of mathematics, so parameters and constraints are generalized (abstracted) to form a generic object network 33. Specific parameters and constraints 34 for use in running a specific job are installed in the generic object network 33, whereby a specific object network 35 for running the specific job is produced.

Figure 26:
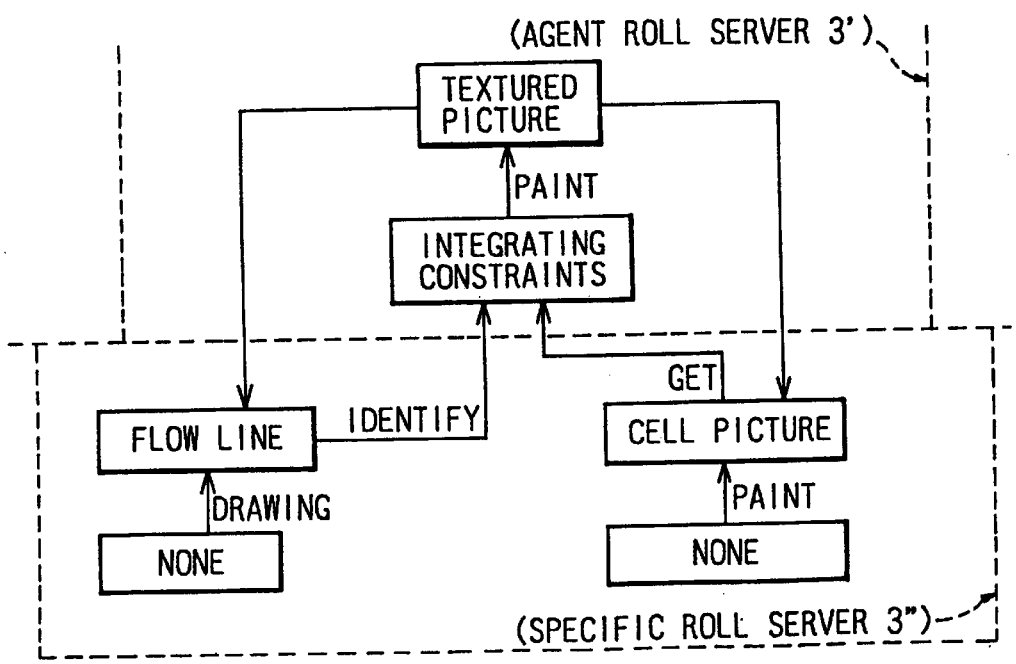
FIG. 26 is a diagram showing an example of a generic object network.

FIG. 26 shows a generic object network for use in performing textured picture drawing through interactions between the agent-role server 3' and the specific role server 3". In FIG. 26, templates representing noun objects encircled with squares are produced by an expert that is a designer of the textured picture drawing system.

Figure 18:
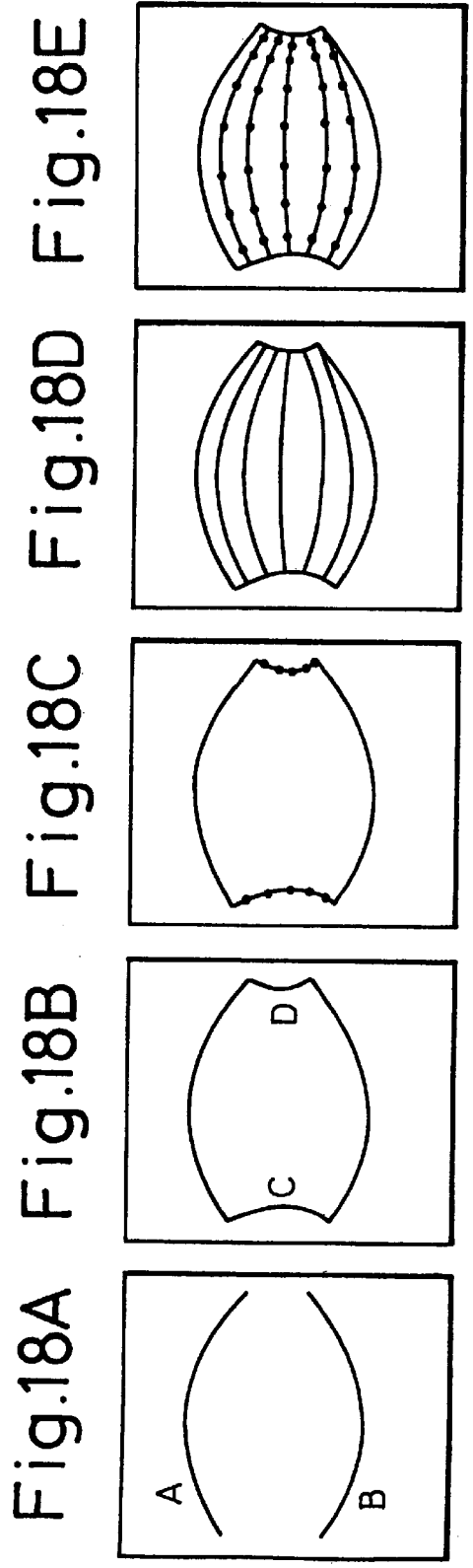
FIGS. 18A to 18E are explanatory diagrams concerning stages of drawing flow lines.

When a client selects noun object Flow Line, part of the graph structure of the element network shown in FIG. 4 including noun objects from Line to None is presented as an aid for a partial drawing process for drawing flow lines to the client 1 by the specific role server 3" via the agent-role server 3'. Using part of the graph structure, the partial drawing process proceeds as shown in FIGS. 18 to 18E.

The templates set in the element network are used as they are. When a modifier "flow" is appended to "line," (i) another attribute area must be defined in the attribute field in the line template and a constraint field must be defined in the line template, and (ii) for textured-picture drawing, positions of dots shown in FIG. 18E must be determined to map a cell picture but lines need not be specified.

For drawing flow lines, flow lines are drawn as shown in FIG. 18D on the drawing of FIG. 18B. Constraints or a sub-network must be designated for drawing dots shown in FIG. 18E.

When a modifier "flow" is appended, as described previously, the agent-role server 3' asks the client to define a distance between adjoining dots on flow lines and a distance between adjoining flow lines under the designated constraints. An inquiry and a response are made through the message window 8 in order to determine the number of dots. The resultant value is set in the field for "constraints on noun objects 25" shown in FIG. 11. The positions of the dots are then determined. The dots in FIG. 18E are used to specify positions to each of which a cell picture is mapped. The dots are not displayed in an actual textured picture drawing screen and deleted at the time of displaying a textured picture.

The same applies to a cell picture. When noun object Picture is selected, a color picture is drawn using the element network. Thereafter, the color picture is mapped to each of the dots shown in FIG. 18E. At this time, since Picture is modified with "cell," the size of each picture is determined with a distance between adjoining dots on flow lines. It is possible to determine a ratio of the size of a cell picture to the distance between adjoining dots on flow lines. This is considered as materialization of an intention of imposing a constraint shown in FIG. 17.

A role played by a specific role server is thought to execute services for materializing basic noun objects and defined using a specific object network. By contrast, an agent-role server is responsible for imposing constraints on noun objects and attaining consistency among services.

Described above will be discussed in terms of inheritance data and synthetic data that are object-oriented attributes mentioned previously.

Inheritance data Based on inheritance data, a template is received from an agent-role server for making a request for a certain job. In other words, a template in which data is stored in line with a data structure determined as a template format according to the inheritance data is received. A specific role server responsible for the job resides in an extensible WELL system and executes the job. Execution may be achieved by the specific role server itself or by any other service module.

Synthetic data A specific role server requested to execute a job on the basis of the inheritance data executes the job. A template format that is a data structure in which the results of executing the job are stored has already been supplied together with the request. The results are then stored in the data structure, and returned as a response to the agent-role server. The sequence is carried out through a common platform (installed in the specific role server) interposed between the agent-role server and specific role server by a communication manager supporting the common platform.

The relationship between the agent-role server 3' and specific role server 3" is identical to that between a client and a server under the control of an extensible WELL system. However, when the agent-role server uses a plurality of data as inheritance data to request a plurality of specific role servers to run a job, the agent-role server must perform constraining. For drawing a textured picture, discrete specific role servers are requested to draw flow lines and a cell picture respectively. With the resultant drawings returned, constraints between the flow lines and cell picture must be satisfied.

Constraining is assigned to a communication manager. The communication manager performs:

(1) conversion dependent on a template format (See Table 1), and (2) communication control for attaining consistency among the contents of a template or templates in the course of constraining.

Image processing and picture drawing can be achieved in a correlative fashion by performing interactive information processing based on a common platform. For example, image processing is performed to extract features; that is, to enhance an edge or highlight a line. The highlighted line then is moved. When a left-hand image viewed by the left eye is produced, the view point is moved to the right eye in order to produce a right-hand image. Thus, a three-dimensional image is produced. Moreover, when the corners of eyes move up and down so that expressions are changed, image processing is performed to detect the positions of the eye corners in order to enhance the features of the expressions.

Feature detection may not always be executed fully by a server. A client selects some points at which distinct features are supposed to be detected, and designates feature names as constraints. Thus, candidate points whose features are to be rendered are determined. Feature points are then selected from among the candidate points. This procedure is performed using, for example, the element network in FIG. 4. Assuming that the client's operations are numbered C1, C2, etc. time-sequentially and the system's actions are numbers S1, S2, etc. time-sequentially, the procedure proceeds as follows:

Colored Region Segment is designated (C1-1), and Region Segment having data of a distinct feature is identified in the data window (C1-2).

"Featured" is typed and Colored Point is designated, whereby a request for seeking Featured Colored Point is sent as a client's intention to the system (C1-3).

The system confirms the client's intention through the message window, displays "Seek featured colored point," and then renders identified Colored Region Segment (S1).

"Highlight" is typed as a constraint for featuring. The nature of highlight has already been set in the system.

Featured (Highlight) Colored Point is extracted (S2).

A word "Featured (Highlight)" is copied, and a colored line segment is identified (C3 to S3).

Thus, a highlighted line is determined. After confirming the highlighted line, the client moves it. The client then moves a new highlighted line and an edge according to the right and left lines of sight. At this time, the system executes a picture drawing service so that an attribute set in Colored can be inherited and that the feature of the highlighted line can be maintained. A movement of the highlighted line is specified by appending a modifier "moved." A moving vector diagram is used to achieve temporal movements.

When a modifier "colored" is appended, areas for attributes of luminance and chromaticity are defined in a template concerned. Likewise, when the foregoing modifiers "highlighted" and "moved" is appended, areas are defined in a template concerned. These modifiers are appended to noun objects. As for verb objects, Draw associated with each of noun objects from Point to Line Segment is inherited. Constraints such as "at the start of execution," "during execution," and "at the end of execution" may be appended to a verb object.

The relationships between an execution request and constraints should be determined so that an execution request can be made for executing a service. That it to say:

(1) only the inheritance attributes provided by the agent-role server 3' are handled in response to a request, and the results are returned as synthesized attributes to the upper-level agent-role server 3.

(2) An execution request is issued when a client designates a verb object in an object network. An execution sequence may be determined using aforesaid execution units (for example, Draw associated with each of noun objects from Point to Line).

(3) As for generic verb objects in a generic object network, an execution sequence is determined as mentioned in item (2).

Constraining is performed to check if temporal constraints described in conjunction with FIG. 17 are satisfied.

When receiving the results of executing a job, the agent-role server 3' enters a constraining process. If any constraint is unsatisfied, the agent-role server 3' instructs a specific role server, which has returned synthetic data to the agent-role server 3', to modify an inheritance attribute and re-execute the job. If the constraint is still unsatisfied, a route or synthesis is followed and a pass for asking a client to make a decision is established.

Description has proceeded on the assumption that only one client is involved. A plurality of clients may work in cooperation. That is to say, a cooperation agent for enabling cooperation is installed as an upper hierarchical level of clients. Thus, a common platform can be shared by the clients in cooperation.

For parallel processing, a structure of an object network may be expressed as shown in FIG. 28 using noun object Top as a destination and Bottom as a departure point. Bottom is comparable to None in FIG. 14.

Figure 27:
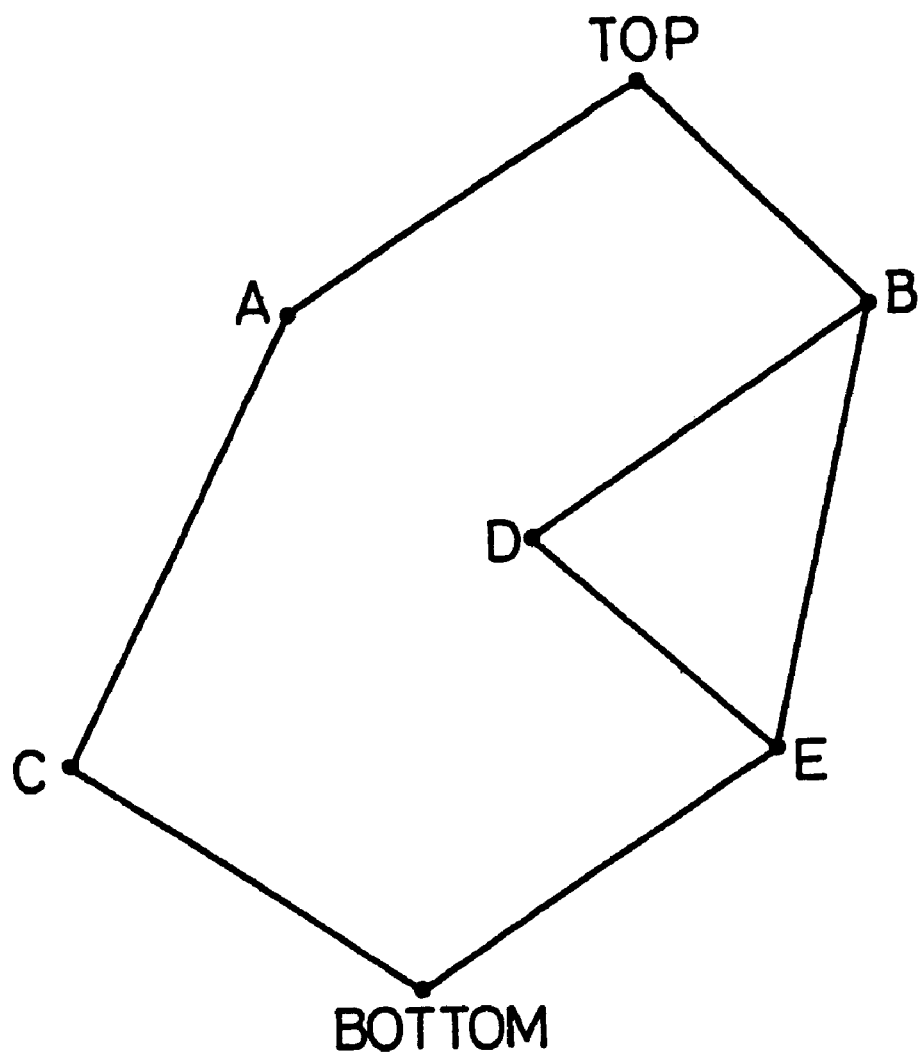
FIG. 27 is an explanatory diagram concerning parallel possessing.

In FIG. 27, assuming that jobs in progress are C and D, subsequently executable jobs are A and D. When parallel execution of A and D is completed, jobs A and B may be handled next. Thus, a structure of an object network is analyzed so that actions of a plurality of servers can be controlled dynamically along with the progress of parallel processing.

What is claimed is:

1. An interactive information processing system, comprising:

an extensible WELL system, including
a window manager producing a common platform including a plurality of windows, the common platform being produced as a field of a conversation between a user and a computer to form a graph-structure object network of noun objects representing a plurality of entities as nodes and verb objects representing operations as branches, at least some of the noun objects having constraints appended thereto,
a display manager converting data to be rendered in the common platform into a visible object,
a function manager, and
an extensible WELL kernel coupled to the function manager, said extensible WELL kernel transferring an instruction, entered by the user by selecting one of the noun objects or verb objects in the graph-structure object network in one of the windows, to the function manager, retrieving an associated object network according to the instruction issued by the user, identifying a state of the data, analyzing an event, and making a request for execution of a function;

a communication manager, coupled to the extensible WELL system and converting the data between the visible object rendered in said common platform and a data structure discernible by the computer using a template defined for each of the noun objects, to communicate an intention of the user to the computer and to visually indicate a processing result of the computer to the user, said communication manager communicating the selection of the user to a language processing facility of the computer and visually indicates a processing result of the computer on said windows, to thereby coordinate data expression forms between the user and the computer; and a plurality of service modules coupled to the extensible WELL system, said service modules including a check module for testing the validity of an entity represented by a noun object by collating data in a template associated with the entity with the constraints appended to the noun objects, wherein:

said function manager, including a graph-structure editor for dynamically modifying the associated object network, selectively activating said plurality of service modules in response to the instruction entered by the user through said common platform and transmitted via said communication manager, said display manager delivering the visible object to the communication manager, said communication manager converting the instruction entered by the user through the common platform into the data recognizable by the service modules, then passing the resultant data to the service modules, said communication manager converting the data between the extensible WELL system independent of any field and the service modules dependent on fields, said communication manager managing correlations between the data so as to maintain the expansibility of the processing means, thereby managing the data in a centralized fashion using templates, and allowing attributes to be set freely in the templates, and said system exhibiting event-driven behavior in which the system is driven with the user's intention and specifies a function corresponding to the intention, and data-driven behavior in which the system waits for data to be entered through the window to execute the function.

2. An interactive information system, comprising:

an agent-role server including means for producing a first common platform comprising a plurality of windows for use in interacting with a client; and a specific role server including means for producing a second common platform including a plurality of windows for use in interacting with a client, at least one of said agent-role server and said specific role server including a communication manager converting data between a visible object rendered in at least one of the first and second common platforms as a graph-structure object network of noun objects representing a plurality of entities as nodes and verb objects representing operations as branches, and a data structure discernible by a computer, using a template for data conversion defined for each of the noun objects, wherein when one of the noun objects has a modifier for modifying a noun, the one of the noun objects has a corresponding template containing an index specifying the modifier;

a plurality of service modules; and processing means for selectively activating said plurality of service modules in response to an instruction entered by a client through the at least one of the first and second common platforms by selecting one of the noun objects or verb objects in the graph-structure object network and transmitted via said communication manager, said processing means including a graph-structure editor to dynamically modify an associated object network;

wherein when said system is in use, said client of said agent-role server is a system user and said client of said specific role server is said agent-role server, while when said system is in development, said client of said agent-role server is an expert familiarized with jobs to be processed by said agent-role server, and said client of said specific role server is a specific expert, said specific role server planning execution of assigned services and executing services for materializing basic noun objects, a role of said specific role server being defined using the associated object network, and said agent-role server and specific role server exhibiting event-driven behavior in which the server is driven with the user's intention and specifies a function corresponding to the intention, and data-driven behavior in which the server waits for data to be entered through the window to execute the function.

3. A method of processing information interactively using a computer to exhibit event-driven behavior in which the computer is driven by a user specifying a function, and data-driven behavior by the computer waiting for data to be entered through a window to execute the function, comprising:

generating a graph-structure object network of noun objects representing a plurality of entities as nodes and verb objects representing operations as branches, at least some of the noun objects having constraints appended thereto;

communicating, via a common platform, a selection of a user of one of the noun and verb objects in the graph-structure object network to a language processing facility of the computer;

retrieving an associated object network based on the selection by the user;

dynamically modifying the associated object network in a graph-structure editor;

converting, in a communication manager coupling the common platform and extensible window-based elaboration language system, the selection by the user into data recognizable by the service modules, independent of any field used by the service modules, by managing correlations between the data in a centralized fashion using templates to maintain expansibility of processing, and allowing attributes to be set freely in the templates;

coordinating data expression forms between the user and the computer in an extensible window-based elaboration language system using the associated object network by converting data between a visible object and a data structure using a template defined for each of the noun objects and visually indicating a processing result of the computer to the user; and testing validity of an entity represented by a noun object in one of the service modules by collating data in a template associated with the entity with the constraints appended to said noun objects.

* * * * *